United States Patent
Lyu et al.

(10) Patent No.: US 10,244,552 B2
(45) Date of Patent: Mar. 26, 2019

(54) DOWNLINK CONTROL INFORMATION SENDING METHOD AND DEVICE, AND DOWNLINK CONTROL INFORMATION RECEIVING METHOD AND DEVICE

(71) Applicant: HUAWEI TECHNOLOGIES CO., LTD., Shenzhen, Guangdong (CN)

(72) Inventors: Yongxia Lyu, Beijing (CN); Wen Zhang, Shenzhen (CN); Wei Sun, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 60 days.

(21) Appl. No.: 15/363,327

(22) Filed: Nov. 29, 2016

(65) Prior Publication Data
US 2017/0079065 A1 Mar. 16, 2017

Related U.S. Application Data

(63) Continuation of application No. PCT/CN2014/079007, filed on May 30, 2014.

(51) Int. Cl.
*H04L 12/28* (2006.01)
*H04W 72/12* (2009.01)
(Continued)

(52) U.S. Cl.
CPC ....... *H04W 72/1289* (2013.01); *H04L 5/1415* (2013.01); *H04W 72/04* (2013.01); *H04W 72/1284* (2013.01)

(58) Field of Classification Search
USPC ................. 370/252, 329, 430, 278
See application file for complete search history.

(56) References Cited

U.S. PATENT DOCUMENTS

| 8,917,603 B2* | 12/2014 | Yang ................. H04W 72/0413 370/235 |
| 2011/0170496 A1* | 7/2011 | Fong ..................... H04L 5/0053 370/329 |

(Continued)

FOREIGN PATENT DOCUMENTS

| CN | 101409582 | 4/2009 |
| CN | 101686466 A | 3/2010 |

(Continued)

OTHER PUBLICATIONS

International Search Report dated Mar. 4, 2015 in corresponding International Application No. PCT/CN2014/079007.

(Continued)

*Primary Examiner* — John Pezzlo
(74) *Attorney, Agent, or Firm* — Staas & Halsey LLP

(57) ABSTRACT

The present invention discloses a downlink control information sending method and device, and a downlink control information receiving method and device. The sending method includes: sending, by a base station device, downlink control information DCI on a physical downlink control channel PDCCH of a downlink subframe, where the DCI is used to instruct user equipment UE to receive physical downlink shared channel PDSCH information in an uplink subframe; and sending the PDSCH information in the uplink subframe. In this way, the base station can effectively schedule an uplink subframe, and a purpose of transmitting a downlink service by using an uplink subframe is achieved, which not only improves utilization of a wireless spectrum resource corresponding to the uplink subframe, but also effectively diverts load pressure of a wireless spectrum resource corresponding to a downlink subframe. Therefore, overall utilization of wireless spectrum resources of a system is improved.

20 Claims, 5 Drawing Sheets

101
A base station device sends downlink control information DCI on a physical downlink control channel PDCCH of a downlink subframe 102
The base station device sends the PDSCH information in the uplink subframe

(51) Int. Cl.
*H04W 72/04* (2009.01)
*H04L 5/14* (2006.01)
*H04J 1/16* (2006.01)

(56) References Cited

U.S. PATENT DOCUMENTS

| | | | |
|---|---|---|---|
| 2011/0176445 A1 | 7/2011 | Chen | |
| 2014/0092829 A1* | 4/2014 | Han | H04L 5/0035 370/329 |
| 2014/0348098 A1 | 11/2014 | Lee et al. | |

FOREIGN PATENT DOCUMENTS

| | | |
|---|---|---|
| CN | 101814944 | 8/2010 |
| CN | 102143596 | 8/2011 |
| CN | 102196580 A | 9/2011 |
| CN | 103716888 A | 4/2014 |
| CN | 105553605 A | 5/2016 |
| EP | 2 835 918 A1 | 2/2015 |
| EP | 2 922 357 | 9/2015 |
| GB | 2498815 | 7/2013 |
| JP | 2015-518679 | 7/2015 |
| WO | 2012020954 A1 | 2/2012 |
| WO | 2013/095041 A1 | 6/2013 |
| WO | 2013/141515 | 9/2013 |
| WO | 2013/151394 A1 | 10/2013 |
| WO | 2014/077607 | 5/2014 |

OTHER PUBLICATIONS

International Search Report dated Mar. 4, 2015 in corresponding International Patent Application No. PCT/CN2014/079007, 4 pages.
Extended European Search Report dated Apr. 19, 2017 in corresponding Europe Patent Application No. 14893165.2, 7 pages.
NextWave Wireless et al., "Way Forward for Half Duplex," 3GPP TSG RAN WG1 #51, Seville, Spain, Jan. 14-18, 2008, R1-080598, 2 pgs.
Qualcomm Incorporated, "Discussion on signaling details for TDD UL-DL reconfiguration," 3GPP TSG RAN WG1 Meeting #76, Prague, Czech Republic, Feb. 10-14, 2014, R1-140439, 4 pgs.
Japanese Office Action dated Feb. 27, 2018, in corresponding Japanese Patent Application No. 2017-514753, 8 pgs.
Chinese Office Action dated Sep. 3, 2018 in related Chinese Patent Application No. 201480021267.7 (9 pages).

\* cited by examiner

US 10,244,552 B2

DOWNLINK CONTROL INFORMATION SENDING METHOD AND DEVICE, AND DOWNLINK CONTROL INFORMATION RECEIVING METHOD AND DEVICE

CROSS-REFERENCE TO RELATED APPLICATIONS

This application is a continuation of International Application No. PCT/CN2014/079007, filed on May 30, 2014, the disclosure of which is hereby incorporated by reference in its entirety.

TECHNICAL FIELD

The present invention relates to the field of wireless communications technologies, and in particular, to a downlink control information sending method and device, and a downlink control information receiving method and device.

BACKGROUND

With an increase in a quantity of users in a mobile communications system, and in particular, an increase in a traffic volume number of a single user, wireless resources are increasingly becoming scarce resources.

In an FDD (frequency division duplex) system, a same bandwidth is used for an uplink frequency band and a downlink frequency band. However, currently, an uplink traffic volume is far less than a downlink traffic volume, which means that relatively more wireless spectrum resources need to be allocated, to meet a requirement of the downlink traffic volume. It is learned from a use process that when these wireless spectrum resources are used for transmitting an uplink service, a large quantity of wireless spectrum resources are idle, and this problem causes relatively low utilization of the wireless spectrum resources.

SUMMARY

In view of this, embodiments of the present invention provide a downlink control information sending method and device, and a downlink control information receiving method and device, which are used to resolve an existing problem of relatively low utilization of a wireless spectrum resource.

According to a first aspect of the present invention, a downlink control information sending method is provided, including:

sending, by a base station device, downlink control information DCI on a physical downlink control channel PDCCH of a downlink subframe, where the DCI is used to instruct user equipment UE to receive physical downlink shared channel PDSCH information in an uplink subframe; and sending, by the base station device, the PDSCH information in the uplink subframe.

With reference to the first aspect of the present invention, in a first possible implementation manner, the method further includes:

sending, by the base station device, a notification message to the user equipment UE, where the notification message is used to indicate a correspondence between a subframe number of a downlink subframe used to send DCI and a subframe number of an uplink subframe used to send PDSCH information, and the notification message includes at least one or more of a system information block SIB or radio resource control RRC signaling.

With reference to the first aspect of the present invention, in a second possible implementation manner, the sending, by a base station device, DCI on a PDCCH of a downlink subframe meets: a quantity of bits of the DCI sent by the base station device is the same as a quantity of bits of DCI format 0/format 1A sent by the base station, and the DCI sent by the base station device includes a check code CRC and/or a scrambling code, where the CRC and/or the scrambling code is used to instruct the UE to receive the physical downlink shared channel PDSCH information in the uplink subframe.

With reference to the second possible implementation manner of the first aspect of the present invention, in a third possible implementation manner, a subframe number of the uplink subframe used to instruct the UE to receive the PDSCH information is the same as a subframe number of the downlink subframe used by the base station device to send the DCI.

With reference to the second possible implementation manner of the first aspect of the present invention, or with reference to the third possible implementation manner of the first aspect of the present invention, in a fourth possible implementation manner, before the sending, by a base station device, downlink control information DCI on a physical downlink control channel PDCCH of a downlink subframe, the method further includes:

sending, by the base station device, downlink transmission mode information to the user equipment UE, where the downlink transmission mode information is used to instruct the UE to detect format information of the downlink control information DCI.

With reference to the fourth possible implementation manner of the first aspect of the present invention, in a fifth possible implementation manner, the sending, by the base station device, downlink transmission mode information to the user equipment UE includes:

sending, by the base station device, the downlink transmission mode information to the user equipment UE by using radio resource control RRC signaling.

With reference to the first aspect of the present invention, with reference to the first possible implementation manner of the first aspect of the present invention, with reference to the second possible implementation manner of the first aspect of the present invention, with reference to the third possible implementation manner of the first aspect of the present invention, with reference to the fourth possible implementation manner of the first aspect of the present invention, or with reference to the fifth possible implementation manner of the first aspect of the present invention, in a sixth possible implementation manner, before the sending, by a base station device, downlink control information DCI on a physical downlink control channel PDCCH of a downlink subframe, the method further includes:

selecting, by the base station device, an uplink subframe that can be used to send the PDSCH information, and determining, according to the correspondence between a subframe number of a downlink subframe used to send DCI and a subframe number of an uplink subframe used to send PDSCH information, a subframe number that is of a downlink subframe and corresponding to a subframe number of the selected uplink subframe used to send the PDSCH information;

the sending, by a base station device, downlink control information DCI on a physical downlink control channel PDCCH of a downlink subframe includes:

sending, by the base station device, the downlink control information DCI on the physical downlink control channel PDCCH of the downlink subframe corresponding to the determined subframe number of the downlink subframe; and the sending, by the base station device, the PDSCH information in the uplink subframe includes:

sending, by the base station device, the PDSCH information in the selected uplink subframe.

With reference to the first aspect of the present invention, with reference to the first possible implementation manner of the first aspect of the present invention, with reference to the second possible implementation manner of the first aspect of the present invention, with reference to the third possible implementation manner of the first aspect of the present invention, with reference to the fourth possible implementation manner of the first aspect of the present invention, with reference to the fifth possible implementation manner of the first aspect of the present invention, or with reference to the sixth possible implementation manner of the first aspect of the present invention, in a seventh possible implementation manner, the uplink subframe used by the base station device to send the PDSCH information is used to send only the PDSCH information, and is not used to send PDCCH information, physical control format indicator channel PCFICH information, or physical hybrid automatic repeat request indicator channel PHICH information.

With reference to the first aspect of the present invention, with reference to the first possible implementation manner of the first aspect of the present invention, with reference to the second possible implementation manner of the first aspect of the present invention, with reference to the third possible implementation manner of the first aspect of the present invention, with reference to the fourth possible implementation manner of the first aspect of the present invention, with reference to the fifth possible implementation manner of the first aspect of the present invention, with reference to the sixth possible implementation manner of the first aspect of the present invention, or with reference to the seventh possible implementation manner of the first aspect of the present invention, in an eighth possible implementation manner, the uplink subframe is carried on an uplink carrier, the downlink subframe is carried on a downlink carrier, and the uplink carrier and the downlink carrier are wireless spectrum resources configured in a frequency division duplex FDD system.

According to a second aspect of the present invention, a downlink control information receiving method is provided, including:

receiving, by user equipment UE, downlink control information DCI sent by a base station device, where the DCI instructs the UE to receive physical downlink shared channel PDSCH information in an uplink subframe; and receiving, by the UE according to the DCI, the PDSCH information sent by the base station device in the uplink subframe.

With reference to the second aspect of the present invention, in a first possible implementation manner, the method further includes:

receiving, by the user equipment UE, a notification message sent by the base station device, where the notification message is used to indicate a correspondence between a subframe number of a downlink subframe used to send DCI and a subframe number of an uplink subframe used to send PDSCH information, and the notification message includes at least one or more of a system information block SIB or radio resource control RRC signaling.

With reference to the second aspect of the present invention, or with reference to the first possible implementation manner of the second aspect of the present invention, in a second possible implementation manner, the receiving, by UE, downlink control information DCI sent by a base station device includes:

receiving, by the UE in a blind detection manner, the DCI sent by the base station device.

With reference to the second aspect of the present invention, in a third possible implementation manner, before the receiving, by UE, downlink control information DCI sent by a base station device, the method further includes:

receiving, by the user equipment UE, downlink transmission mode information sent by the base station device, where the downlink transmission mode information is used to instruct the UE to detect format information of the downlink control information DCI.

With reference to the third possible implementation manner of the second aspect of the present invention, in a fourth possible implementation manner, the receiving, by UE, downlink control information DCI sent by a base station device includes:

performing, by the UE according to the downlink transmission mode information, blind detection on the downlink control information DCI sent by the base station device, where the DCI sent by the base station device meets: a quantity of bits of the DCI sent by the base station device is the same as a quantity of bits of DCI format 0/format 1A sent by the base station device, and the DCI sent by the base station device includes a check code CRC and/or a scrambling code, where the CRC and/or the scrambling code is used to instruct the UE to receive the physical downlink shared channel PDSCH information in the uplink subframe.

With reference to the fourth possible implementation manner of the second aspect of the present invention, in a fifth possible implementation manner, the performing, by the UE according to the downlink transmission mode information, blind detection on the downlink control information DCI sent by the base station device includes:

descrambling or demasking, by the UE each time a piece of DCI is detected, a check code CRC of the detected DCI by using a scrambling or masking C-RNTI code $x_{rnti,k}$, and determining whether the CRC obtained after the descrambling or demasking is $b_k$; and if the obtained CRC is not $b_k$, descrambling or demasking the CRC of the detected DCI by using the scrambling or masking C-RNTI code $x_{rnti,k}$ and a scrambling code $a_k$, and determining, when it is determined that the CRC obtained after the descrambling or demasking is $C_k$, that the DCI sent by the base station device and used to instruct the UE to receive the PDSCH information in the uplink subframe is received.

With reference to the second aspect of the present invention, with reference to the first possible implementation manner of the second aspect of the present invention, with reference to the second possible implementation manner of the second aspect of the present invention, with reference to the third possible implementation manner of the second aspect of the present invention, with reference to the fourth possible implementation manner of the second aspect of the present invention, or with reference to the fifth possible implementation manner of the second aspect of the present invention, in a sixth possible implementation manner, after the receiving, by UE, DCI sent by a base station device, the method further includes:

determining, by the UE, a subframe number of a downlink subframe in which the DCI is received; and the receiving, by the UE according to the DCI, the PDSCH information sent by the base station device in the uplink subframe includes:

determining, by the UE according to the correspondence between a subframe number of a downlink subframe used to send DCI and a subframe number of an uplink subframe used to send PDSCH information, and the determined subframe number of the downlink subframe in which the DCI is received, a subframe number of the uplink subframe used by the base station device to send the PDSCH information; and receiving, by the UE in the uplink subframe corresponding to the determined subframe number of the uplink subframe, the PDSCH information sent by the base station device.

With reference to the second aspect of the present invention, with reference to the first possible implementation manner of the second aspect of the present invention, with reference to the second possible implementation manner of the second aspect of the present invention, with reference to the third possible implementation manner of the second aspect of the present invention, with reference to the fourth possible implementation manner of the second aspect of the present invention, with reference to the fifth possible implementation manner of the second aspect of the present invention, or with reference to the sixth possible implementation manner of the second aspect of the present invention, in a seventh possible implementation manner, when the UE receives the PDSCH information, the method further includes:

sending, by the UE, acknowledgment/non-acknowledgment ACK/NACK to the base station device.

With reference to the seventh possible implementation manner of the second aspect of the present invention, in an eighth possible implementation manner, the sending, by the UE, ACK/NACK to the base station device includes:

determining, by the UE according to a correspondence between a subframe number of a downlink subframe used to receive DCI and a subframe number of an uplink subframe used to send ACK/NACK, a subframe number of an uplink subframe used to send the ACK/NACK, and sending the ACK/NACK in the uplink subframe corresponding to the determined subframe number of the uplink subframe.

With reference to the seventh possible implementation manner of the second aspect of the present invention, in a ninth possible implementation manner, the sending, by the UE, ACK/NACK to the base station device includes:

determining, by the UE according to a correspondence between a subframe number of an uplink subframe used to receive PDSCH information and a subframe number of an uplink subframe used to send ACK/NACK, a subframe number of an uplink subframe used to send the ACK/NACK, and sending the ACK/NACK in the uplink subframe corresponding to the determined subframe number of the uplink subframe.

With reference to the seventh possible implementation manner of the second aspect of the present invention, or with reference to the eighth possible implementation manner of the second aspect of the present invention, in a ninth possible implementation manner, the sending, by the UE, the ACK/NACK in the uplink subframe corresponding to the determined subframe number of the uplink subframe includes:

reselecting, by the UE when it is determined that the uplink subframe corresponding to the subframe number of the uplink subframe used to send the ACK/NACK has been scheduled for sending a downlink service, an uplink subframe that has not been scheduled for sending a downlink service and whose difference from the determined subframe number of the uplink subframe is the smallest, and sending the ACK/NACK in the reselected uplink subframe.

According to a third aspect of the present invention, a downlink control information sending device is provided, including:

a downlink control information DCI sending module, configured to send downlink control information DCI on a physical downlink control channel PDCCH of a downlink subframe, where the DCI is used to instruct user equipment UE to receive physical downlink shared channel PDSCH information in an uplink subframe; and a physical downlink shared channel PDSCH information sending module, configured to send the PDSCH information in the uplink subframe.

With reference to the third aspect of the present invention, in a first possible implementation manner, the device further includes:

a notification message sending module, configured to send a notification message to the user equipment UE, where the notification message is used to indicate a correspondence between a subframe number of a downlink subframe used to send DCI and a subframe number of an uplink subframe used to send PDSCH information, and the notification message includes at least one or more of a system information block SIB or radio resource control RRC signaling.

With reference to the third aspect of the present invention, in a second possible implementation manner, that the sending device sends the DCI on the PDCCH of the downlink subframe meets: a quantity of bits of the DCI sent by the sending device is the same as a quantity of bits of DCI format 0/format 1A sent by the sending device, and the DCI sent by the sending device includes a check code CRC and/or a scrambling code, where the CRC and/or the scrambling code is used to instruct the UE to receive the physical downlink shared channel PDSCH information in the uplink subframe.

With reference to the second possible implementation manner of the third aspect of the present invention, in a third possible implementation manner, a subframe number of the uplink subframe used to instruct the UE to receive the PDSCH information is the same as a subframe number of the downlink subframe used by the sending device to send the DCI.

With reference to the second possible implementation manner of the third aspect of the present invention, or with reference to the third possible implementation manner of the third aspect of the present invention, in a fourth possible implementation manner, the sending device further includes:
a mode information sending module, and
the mode information sending module is configured to send downlink transmission mode information to the user equipment UE before the DCI sending module sends the downlink control information DCI on the physical downlink control channel PDCCH of the downlink subframe, where the downlink transmission mode information is used to instruct the UE to detect format information of the downlink control information DCI.

With reference to the fourth possible implementation manner of the third aspect of the present invention, in a fifth possible implementation manner, the mode information sending module is specifically configured to send the downlink transmission mode information to the user equipment UE by using radio resource control RRC signaling.

With reference to the third aspect of the present invention, with reference to the first possible implementation manner of the third aspect of the present invention, with reference to the second possible implementation manner of the third aspect of the present invention, with reference to the third possible implementation manner of the third aspect of the present invention, with reference to the fourth possible implementation manner of the third aspect of the present invention, or with reference to the fifth possible implementation manner of the third aspect of the present invention, in a sixth possible implementation manner, the sending device further includes: a subframe determining module, where the subframe determining module is configured to: before the DCI sending module sends the downlink control information DCI on the physical downlink control channel PDCCH of the downlink subframe, select an uplink subframe that can be used to send the PDSCH information, and determine, according to a correspondence between a subframe number of a downlink subframe used to send DCI and a subframe number of an uplink subframe used to send PDSCH information, a subframe number that is of a downlink subframe and corresponding to a subframe number of the selected uplink subframe used to send the PDSCH information;

the DCI sending module is specifically configured to send the downlink control information DCI on the physical downlink control channel PDCCH of the downlink subframe corresponding to the determined subframe number of the downlink subframe; and the PDSCH sending module is specifically configured to send the PDSCH information in the selected uplink subframe.

With reference to the third aspect of the present invention, with reference to the first possible implementation manner of the third aspect of the present invention, with reference to the second possible implementation manner of the third aspect of the present invention, with reference to the third possible implementation manner of the third aspect of the present invention, with reference to the fourth possible implementation manner of the third aspect of the present invention, with reference to the fifth possible implementation manner of the third aspect of the present invention, or with reference to the sixth possible implementation manner of the third aspect of the present invention, in a seventh possible implementation manner, the uplink subframe used by the sending device to send the PDSCH information is used to send only the PDSCH information, and is not used to send PDCCH information, physical control format indicator channel PCFICH information, or physical hybrid automatic repeat request indicator channel PHICH information.

With reference to the third aspect of the present invention, with reference to the first possible implementation manner of the third aspect of the present invention, with reference to the second possible implementation manner of the third aspect of the present invention, with reference to the third possible implementation manner of the third aspect of the present invention, with reference to the fourth possible implementation manner of the third aspect of the present invention, with reference to the fifth possible implementation manner of the third aspect of the present invention, with reference to the sixth possible implementation manner of the third aspect of the present invention, or with reference to the seventh possible implementation manner of the third aspect of the present invention, in an eighth possible implementation manner, the uplink subframe is carried on an uplink carrier, the downlink subframe is carried on a downlink carrier, and the uplink carrier and the downlink carrier are wireless spectrum resources configured in a frequency division duplex FDD system.

According to a fourth aspect of the present invention, a downlink control information receiving device is provided, including:

a downlink control information DCI receiving module, configured to receive downlink control information DCI sent by a base station device, where the DCI instructs the UE to receive physical downlink shared channel PDSCH information in an uplink subframe; and a physical downlink shared channel PDSCH information receiving module, configured to receive, according to the DCI received by the DCI receiving module, the PDSCH information sent by the base station device in the uplink subframe.

With reference to the fourth aspect of the present invention, in a first possible implementation manner, the receiving device further includes:

a notification message receiving module, configured to receive a notification message sent by the base station device, where the notification message is used to indicate a correspondence between a subframe number of a downlink subframe used to send DCI and a subframe number of an uplink subframe used to send PDSCH information, and the notification message includes at least one or more of a system information block SIB or radio resource control RRC signaling.

With reference to the fourth aspect of the present invention, or with reference to the first possible implementation manner of the fourth aspect of the present invention, in a second possible implementation manner, the DCI receiving module is specifically configured to receive, in a blind detection manner, the DCI sent by the base station device.

With reference to the fourth aspect of the present invention, in a third possible implementation manner, the receiving device further includes:

a transmission mode information receiving module, configured to receive, before the DCI receiving module receives the downlink control information DCI sent by the base station device, downlink transmission mode information sent by the base station device, where the downlink transmission mode information is used to instruct the UE to detect format information of the downlink control information DCI.

With reference to the third possible implementation manner of fourth aspect of the present invention, in a fourth possible implementation manner, the DCI receiving module is specifically configured to perform, according to the downlink transmission mode information, blind detection on the downlink control information DCI sent by the base station device, where the DCI sent by the base station device meets: a quantity of bits of the DCI sent by the base station device is the same as a quantity of bits of DCI format 0/format 1A sent by the base station device, and the DCI sent by the base station device includes a check code CRC and/or a scrambling code, where the CRC and/or the scrambling code is used to instruct the UE to receive the physical downlink shared channel PDSCH information in the uplink subframe.

With reference to the fourth possible implementation manner of fourth aspect of the present invention, in a fifth possible implementation manner, the DCI receiving module is specifically configured to: descramble or demask, each time a piece of DCI is detected, a check code CRC of the detected DCI by using a scrambling or masking C-RNTI code $x_{rnti,k}$, and determine whether the CRC obtained after the descrambling or demasking is $b_k$; and if the obtained CRC is not $b_k$, descramble or demask the CRC of the detected DCI by using the scrambling or masking C-RNTI code $x_{rnti,k}$ and a scrambling code $a_k$, and determine, when it is determined that the CRC obtained after the descrambling or demasking is $C_k$, that the DCI sent by the base station device and used to instruct the UE to receive the PDSCH information in the uplink subframe is received.

With reference to the fourth aspect of the present invention, with reference to the first possible implementation manner of the fourth aspect of the present invention, with reference to the second possible implementation manner of the fourth aspect of the present invention, with reference to the third possible implementation manner of the fourth aspect of the present invention, with reference to the fourth possible implementation manner of the fourth aspect of the present invention, or with reference to the fifth possible implementation manner of the fourth aspect of the present invention, in a sixth possible implementation manner, the receiving device further includes: a subframe number determining module;

the subframe number determining module is configured to determine, after the DCI receiving module receives the DCI sent by the base station device, a subframe number of a downlink subframe in which the DCI is received; and the PDSCH information receiving module is specifically configured to: determine, according to the correspondence between a subframe number of a downlink subframe used to send DCI and a subframe number of an uplink subframe used to send PDSCH information, and the determined subframe number of the downlink subframe in which the DCI is received, a subframe number of the uplink subframe used by the base station device to send the PDSCH information; and receive, in the uplink subframe corresponding to the determined subframe number of the uplink subframe, the PDSCH information sent by the base station device.

With reference to the fourth aspect of the present invention, with reference to the first possible implementation manner of the fourth aspect of the present invention, with reference to the second possible implementation manner of the fourth aspect of the present invention, with reference to the third possible implementation manner of the fourth aspect of the present invention, with reference to the fourth possible implementation manner of the fourth aspect of the present invention, with reference to the fifth possible implementation manner of the fourth aspect of the present invention, or with reference to the sixth possible implementation manner of the fourth aspect of the present invention, in a seventh possible implementation manner, the receiving device further includes: a sending module, and the sending module is configured to send acknowledgment/non-acknowledgment ACK/NACK to the base station device when the PDSCH information receiving module receives the PDSCH information.

With reference to the seventh possible implementation manner of the fourth aspect of the present invention, in an eighth possible implementation manner, the sending module is specifically configured to: determine, according to a correspondence between a subframe number of a downlink subframe used to receive DCI and a subframe number of an uplink subframe used to send ACK/NACK, a subframe number of an uplink subframe used to send the ACK/NACK, and send the ACK/NACK in the uplink subframe corresponding to the determined subframe number of the uplink subframe.

With reference to the seventh possible implementation manner of the fourth aspect of the present invention, in a ninth possible implementation manner, the sending module is specifically configured to: determine, according to a correspondence between a subframe number of an uplink subframe used to receive PDSCH information and a subframe number of an uplink subframe used to send ACK/NACK, a subframe number of an uplink subframe used to send the ACK/NACK, and send the ACK/NACK in the uplink subframe corresponding to the determined subframe number of the uplink subframe.

With reference to the seventh possible implementation manner of the fourth aspect of the present invention, or with reference to the eighth possible implementation manner of the fourth aspect of the present invention, in a ninth possible implementation manner, the sending module is specifically configured to: reselect, when it is determined that the uplink subframe corresponding to the subframe number of the uplink subframe used to send the ACK/NACK has been scheduled for sending a downlink service, an uplink subframe that has not been scheduled for sending a downlink service and whose difference from the determined subframe number of the uplink subframe is the smallest, and send the ACK/NACK in the reselected uplink subframe.

According to a fifth aspect of the present invention, a downlink control information sending device is provided, including:

a signal transmitter, configured to send downlink control information DCI on a physical downlink control channel PDCCH of a downlink subframe, where the DCI is used to instruct user equipment UE to receive physical downlink shared channel PDSCH information in an uplink subframe; and the signal transmitter is further configured to send the PDSCH information in the uplink subframe.

With reference to the fifth aspect of the present invention, in a first possible implementation manner, the signal transmitter is further configured to send a notification message to the user equipment UE, where the notification message is used to indicate a correspondence between a subframe number of a downlink subframe used to send DCI and a subframe number of an uplink subframe used to send PDSCH information, and the notification message includes at least one or more of a system information block SIB or radio resource control RRC signaling.

With reference to the fifth aspect of the present invention, in a second possible implementation manner, that the sending device sends the DCI on the PDCCH of the downlink subframe meets: a quantity of bits of the DCI sent by the sending device is the same as a quantity of bits of DCI format 0/format 1A sent by the sending device, and the DCI sent by the sending device includes a check code CRC and/or a scrambling code, where the CRC and/or the scrambling code is used to instruct the UE to receive the physical downlink shared channel PDSCH information in the uplink subframe.

With reference to the second possible implementation manner of the fifth aspect of the present invention, in a third possible implementation manner, a subframe number of the uplink subframe used to instruct the UE to receive the PDSCH information is the same as a subframe number of the downlink subframe used by the base station device to send the DCI.

With reference to the second possible implementation manner of the fifth aspect of the present invention, or with reference to the third possible implementation manner of the fifth aspect of the present invention, in a fourth possible implementation manner, the signal transmitter is further configured to send downlink transmission mode information to the user equipment UE before sending the downlink control information DCI on the physical downlink control channel PDCCH of the downlink subframe, where the downlink transmission mode information is used to instruct the UE to detect format information of the downlink control information DCI.

With reference to the fourth possible implementation manner of the fifth aspect of the present invention, in a fifth possible implementation manner, the signal transmitter is specifically configured to send the downlink transmission mode information to the user equipment UE by using radio resource control RRC signaling.

With reference to the fifth aspect of the present invention, with reference to the first possible implementation manner of the fifth aspect of the present invention, with reference to the second possible implementation manner of the fifth aspect of the present invention, with reference to the third possible implementation manner of the fifth aspect of the present invention, with reference to the fourth possible implementation manner of the fifth aspect of the present invention, or with reference to the fifth possible implementation manner of the fifth aspect of the present invention, in a sixth possible implementation manner, the sending device further includes: a processor, where the processor is configured to: before the downlink control information DCI is sent on the physical downlink control channel PDCCH of the downlink subframe, select an uplink subframe that can be used to send the PDSCH information, and determine, according to the correspondence between a subframe number of a downlink subframe used to send DCI and a subframe number of an uplink subframe used to send PDSCH information, a subframe number that is of a downlink subframe and corresponding to a subframe number of the selected uplink subframe used to send the PDSCH information;

the signal transmitter is specifically configured to send the downlink control information DCI on the physical downlink control channel PDCCH of the downlink subframe corresponding to the determined subframe number of the downlink subframe; and the signal transmitter is further specifically configured to send the PDSCH information in the selected uplink subframe.

With reference to the fifth aspect of the present invention, with reference to the first possible implementation manner of the fifth aspect of the present invention, with reference to the second possible implementation manner of the fifth aspect of the present invention, with reference to the third possible implementation manner of the fifth aspect of the present invention, with reference to the fourth possible implementation manner of the fifth aspect of the present invention, with reference to the fifth possible implementation manner of the fifth aspect of the present invention, or with reference to the sixth possible implementation manner of the fifth aspect of the present invention, in a seventh possible implementation manner, the uplink subframe used by the sending device to send the PDSCH information is used to send only the PDSCH information, and is not used to send PDCCH information, physical control format indicator channel PCFICH information, or physical hybrid automatic repeat request indicator channel PHICH information.

With reference to the fifth aspect of the present invention, with reference to the first possible implementation manner of the fifth aspect of the present invention, with reference to the second possible implementation manner of the fifth aspect of the present invention, with reference to the third possible implementation manner of the fifth aspect of the present invention, with reference to the fourth possible implementation manner of the fifth aspect of the present invention, with reference to the fifth possible implementation manner of the fifth aspect of the present invention, with reference to the sixth possible implementation manner of the fifth aspect of the present invention, or with reference to the seventh possible implementation manner of the fifth aspect of the present invention, in an eighth possible implementation manner, the uplink subframe is carried on an uplink carrier, the downlink subframe is carried on a downlink carrier, and the uplink carrier and the downlink carrier are wireless spectrum resources configured in a frequency division duplex FDD system.

According to a sixth aspect of the present invention, a downlink control information receiving device is provided, including:

a signal receiver, configured to receive downlink control information DCI sent by a base station device, where the DCI instructs the UE to receive physical downlink shared channel PDSCH information in an uplink subframe; and the signal receiver is further configured to receive, according to the DCI, the PDSCH information sent by the base station device in the uplink subframe.

With reference to the sixth aspect of the present invention, in a first possible implementation manner, the signal receiver is further configured to receive a notification message sent by the base station device, where the notification message is used to indicate a correspondence between a subframe number of a downlink subframe used to send DCI and a subframe number of an uplink subframe used to send PDSCH information, and the notification message includes at least one or more of a system information block SIB or radio resource control RRC signaling.

With reference to the sixth aspect of the present invention, or with reference to the first possible implementation manner of the sixth aspect of the present invention, in a second possible implementation manner, the signal receiver is specifically configured to receive, in a blind detection manner, the DCI sent by the base station device.

With reference to the sixth aspect of the present invention, in a third possible implementation manner, the signal receiver is further configured to receive, before receiving the downlink control information DCI sent by the base station device, downlink transmission mode information sent by the base station device, where the downlink transmission mode information is used to instruct the UE to detect format information of the downlink control information DCI.

With reference to the third possible implementation manner of sixth aspect of the present invention, in a fourth possible implementation manner, the signal receiver is specifically configured to perform, according to the downlink transmission mode information, blind detection on the downlink control information DCI sent by the base station device, where the DCI sent by the base station device meets: a quantity of bits of the DCI sent by the base station device is the same as a quantity of bits of DCI format 0/format 1A sent by the base station device, and the DCI sent by the base station device includes a check code CRC and/or a scrambling code, where the CRC and/or the scrambling code is used to instruct the UE to receive the physical downlink shared channel PDSCH information in the uplink subframe.

With reference to the fourth possible implementation manner of sixth aspect of the present invention, in a fifth possible implementation manner, the signal receiver is specifically configured to: descramble or demask, each time a piece of DCI is detected, a check code CRC of the detected DCI by using a scrambling or masking C-RNTI code $x_{rnti,k}$, and determine whether the CRC obtained after the descrambling or demasking is $b_k$; and if the obtained CRC is not $b_k$, descramble or demask the CRC of the detected DCI by using the scrambling or masking C-RNTI code $x_{rnti,k}$ and a scrambling code $a_k$, and determine, when it is determined that the CRC obtained after the descrambling or demasking is $C_k$, that the DCI sent by the base station device and used to instruct the UE to receive the PDSCH information in the uplink subframe is received.

With reference to the sixth aspect of the present invention, with reference to the first possible implementation manner of the sixth aspect of the present invention, with reference to the second possible implementation manner of the sixth aspect of the present invention, with reference to the third possible implementation manner of the sixth aspect of the present invention, with reference to the fourth possible implementation manner of the sixth aspect of the present invention, or with reference to the fifth possible implementation manner of the sixth aspect of the present invention, in a sixth possible implementation manner, the receiving device further includes: a processor, where the processor is configured to determine, after the signal receiver receives the DCI sent by the base station device, a subframe number of a downlink subframe in which the DCI is received; and the signal receiver is specifically configured to: determine, according to the correspondence between a subframe number of a downlink subframe used to send DCI and a subframe number of an uplink subframe used to send PDSCH information, and the determined subframe number of the downlink subframe in which the DCI is received, a subframe number of the uplink subframe used by the base station device to send the PDSCH information; and receive, in the uplink subframe corresponding to the determined subframe number of the uplink subframe, the PDSCH information sent by the base station device.

With reference to the sixth aspect of the present invention, with reference to the first possible implementation manner of the sixth aspect of the present invention, with reference to the second possible implementation manner of the sixth aspect of the present invention, with reference to the third possible implementation manner of the sixth aspect of the present invention, with reference to the fourth possible implementation manner of the sixth aspect of the present invention, with reference to the fifth possible implementation manner of the sixth aspect of the present invention, or with reference to the sixth possible implementation manner of the sixth aspect of the present invention, in a seventh possible implementation manner, the receiving device further includes: a signal transmitter, where the signal transmitter is configured to send acknowledgment/non-acknowledgment ACK/NACK to the base station device when the signal receiver receives the PDSCH information.

With reference to the seventh possible implementation manner of the sixth aspect of the present invention, in an eighth possible implementation manner, the signal transmitter is specifically configured to: determine, according to a correspondence between a subframe number of a downlink subframe used to receive DCI and a subframe number of an uplink subframe used to send ACK/NACK, a subframe number of an uplink subframe used to send the ACK/NACK, and send the ACK/NACK in the uplink subframe corresponding to the determined subframe number of the uplink subframe.

With reference to the seventh possible implementation manner of the sixth aspect of the present invention, in a ninth possible implementation manner, the signal transmitter is specifically configured to: determine, according to a correspondence between a subframe number of an uplink subframe used to receive PDSCH information and a subframe number of an uplink subframe used to send ACK/NACK, a subframe number of an uplink subframe used to send the ACK/NACK, and send the ACK/NACK in the uplink subframe corresponding to the determined subframe number of the uplink subframe.

With reference to the seventh possible implementation manner of the sixth aspect of the present invention, or with reference to the eighth possible implementation manner of the sixth aspect of the present invention, in a ninth possible implementation manner, the signal transmitter is specifically configured to: reselect, when it is determined that the uplink subframe corresponding to the subframe number of the uplink subframe used to send the ACK/NACK has been scheduled for sending a downlink service, an uplink subframe that has not been scheduled for sending a downlink service and whose difference from the determined subframe number of the uplink subframe is the smallest, and send the ACK/NACK in the reselected uplink subframe.

According to the embodiments of the present invention, a base station device sends downlink control information DCI on a physical downlink control channel PDCCH of a downlink subframe, where the DCI is used to instruct user equipment UE to receive physical downlink shared channel PDSCH information in an uplink subframe; and sends the PDSCH information in the uplink subframe. In this way, the base station can effectively schedule an uplink subframe, and a purpose of transmitting a downlink service by using an uplink subframe is achieved, which not only improves utilization of a wireless spectrum resource corresponding to the uplink subframe, but also effectively diverts load pressure of a wireless spectrum resource corresponding to a downlink subframe. Therefore, overall utilization of wireless spectrum resources of a system is improved.

BRIEF DESCRIPTION OF DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

To achieve the purpose of the present invention, embodiments of the present invention provide a downlink control information sending method and device, and a downlink control information receiving method and device. A base station device sends downlink control information DCI on a physical downlink control channel PDCCH of a downlink subframe, where the DCI is used to instruct user equipment UE to receive physical downlink shared channel PDSCH information in an uplink subframe; and sends the PDSCH information in the uplink subframe. In this way, the base station can effectively schedule an uplink subframe, and a purpose of transmitting a downlink service by using an uplink subframe is achieved, which not only improves utilization of a wireless spectrum resource corresponding to the uplink subframe, but also effectively diverts load pressure of a wireless spectrum resource corresponding to a downlink subframe. Therefore, overall utilization of wireless spectrum resources of a system is improved.

It should be noted that a downlink subframe involved in the embodiments of the present invention is carried on a downlink carrier, and an uplink subframe is carried on an uplink carrier. The downlink carrier and the uplink carrier are wireless spectrum resources configured for a base station device in an FDD system. That is, the embodiments of the present invention are applied to the FDD system or another system similar to the frequency division duplex system, and no specific limitation is imposed herein.

The following describes the embodiments of the present invention in detail with reference to accompanying drawings in this specification. Apparently, the described embodiments are merely some but not all of the embodiments of the present invention. All other embodiments obtained by a person of ordinary skill in the art based on the embodiments of the present invention without creative efforts shall fall within the protection scope of the present invention.

Embodiment 1

Figure 1:
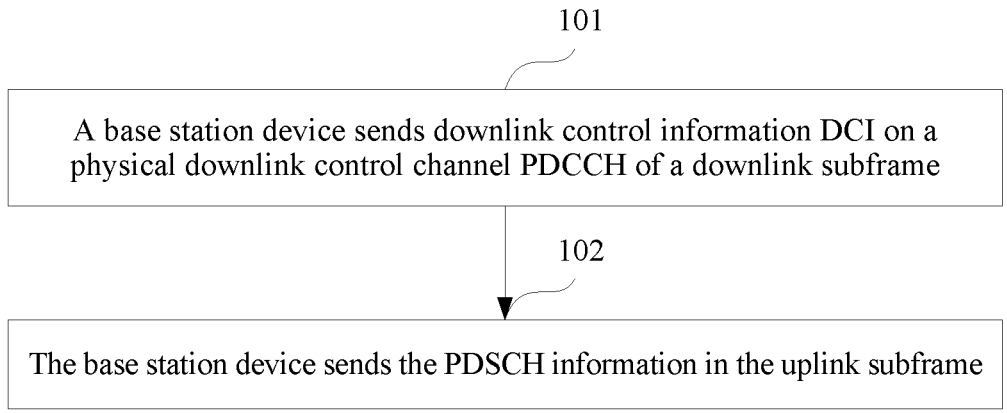
FIG. 1 is a schematic flowchart of a downlink control information sending method according to Embodiment 1 of the present invention.

As shown in FIG. 1, FIG. 1 is a schematic flowchart of a downlink control information sending method according to Embodiment 1 of the present invention. The method may be described as follows:

Step 101. A base station device sends downlink control information DCI on a physical downlink control channel PDCCH of a downlink subframe.

The DCI is used to instruct user equipment UE to receive PDSCH (physical downlink shared channel) information in an uplink subframe.

In step 101, in an LTE (Long Term Evolution) system, at each TTI (transmission time interval), the UE (user equipment) obtains the DCI (downlink control information) by detecting a PDCCH (physical downlink control channel) or an ePDCCH (enhanced physical downlink control channel).

The DCI includes downlink scheduling information and scheduling authorization information of an uplink subframe.

In addition, the PDCCH is a physical downlink control channel, and is located in a control field part of a time-frequency resource in a subframe, that is, the PDCCH occupies first N OFDM (orthogonal frequency division multiplexing) symbols of a subframe in a time-frequency resource. A PCFICH (physical control format indicator channel) is used to indicate the first N OFDM symbols occupied by the PDCCH channel.

It should be noted that N is greater than 0 and less than or equal to 3, and generally, when a system bandwidth is 1.4 M, a value of N is 4.

The ePDCCH occupies an entire subframe, and occupies one or more RBs (resource block) in terms of a frequency domain resource.

In this embodiment of the present invention, the physical downlink control channel PDCCH is a general term and includes the PDCCH located in the first N OFDM symbols of the subframe and/or the ePDCCH.

Specifically, the base station device sends the downlink control information DCI on the physical downlink control channel PDCCH of the downlink subframe, where the DCI is used to instruct the user equipment UE to receive the physical downlink shared channel PDSCH information in the uplink subframe. The DCI may be conventional DCI, or may be DCI in a new format.

If the DCI sent by the base station device is DCI in a new format, that a base station device sends DCI on a PDCCH of a downlink subframe meets: a quantity of bits of the DCI sent by the base station device is the same as a quantity of bits of DCI format 0/format 1A sent by the base station device, and the DCI sent by the base station device includes a check code CRC and/or a scrambling code, where the CRC and/or the scrambling code is used to instruct the UE to receive the physical downlink shared channel PDSCH information in the uplink subframe.

In this case, in another embodiment of the present invention, optionally, before that a base station device sends downlink control information DCI on a physical downlink control channel PDCCH of a downlink subframe, the method further includes:

sending, by the base station device, downlink transmission mode information to the user equipment UE, where the downlink transmission mode information is used to instruct the UE to detect format information of the downlink control information DCI.

Specifically, the sending, by the base station device, downlink transmission mode information to the user equipment UE includes:

sending, by the base station device, the downlink transmission mode information to the user equipment UE by using RRC signaling.

Optionally, a subframe number of the uplink subframe used to instruct the UE to receive the PDSCH information is the same as a subframe number of the downlink subframe used by the base station device to send the DCI.

Regardless of whether the base station device sends conventional DCI or DCI in a new format, in another embodiment of the present invention, optionally, before a base station device sends downlink control information DCI on a physical downlink control channel PDCCH of a downlink subframe, the method further includes:

selecting, by the base station device, an uplink subframe that can be used to send the PDSCH information, and determining, according to a correspondence between a subframe number of a downlink subframe used to send DCI and a subframe number of an uplink subframe used to send PDSCH information, a subframe number that is of a downlink subframe and corresponding to a subframe number of the selected uplink subframe used to send the PDSCH information.

When scheduling a wireless spectrum resource, the base station device can determine which subframe in the uplink carrier is a relatively idle subframe. In this case, the base station device may select a relatively idle uplink subframe as the uplink subframe that can be used to send the PDSCH information. A manner in which the base station device selects the uplink subframe that can be used to send the PDSCH information may be determined according to an actual need, or may be determined according to experience, which is not limited herein.

It should be noted that the correspondence between a subframe number of a downlink subframe used to send DCI and a subframe number of an uplink subframe used to send PDSCH information may be configured by the base station device in advance, may be determined through negotiation with the user equipment, or may be sent to the base station device and the user equipment after being configured in the system, which is not limited herein.

If the correspondence between a subframe number of a downlink subframe used to send DCI and a subframe number of an uplink subframe used to send PDSCH information is randomly configured by the base station device, in this embodiment of the present invention, the method further includes:

sending, by the base station device, a notification message to the user equipment UE.

The notification message is used to indicate the correspondence between a subframe number of a downlink subframe used to send DCI and a subframe number of an uplink subframe used to send PDSCH information, and the notification message includes at least one or more of a SIB (system information block) and RRC (radio resource control) signaling.

It should be noted that, in the correspondence between a subframe number of a downlink subframe used to send downlink control information DCI and a subframe number of an uplink subframe used to send physical downlink shared channel PDSCH information, a specific time corresponding to the subframe number of the downlink subframe may be the same as or may be different from a specific time corresponding to the subframe number of the uplink subframe. If the downlink subframe completely does not overlap the uplink subframe in terms of time, the base station device can avoid sending the DCI and the PDSCH at a same time, so that the UE does not need to cache data on frequency bands of both the downlink subframe and the uplink subframe, and a caching capability of the UE does not need to be increased, that is, no extra overheads of the system needs to be increased. Therefore, a purpose of saving a system resource is achieved.

In this way, the base station device schedules the PDSCH information to the uplink subframe for sending, which helps to improve utilization of a wireless spectrum resource.

For example, the subframe number of the uplink subframe that is selected by the base station device and can be used to send the PDSCH information is (n+m), and in this case, it is determined that a subframe number of a downlink subframe corresponding to the subframe number of the selected uplink subframe used to send the PDSCH information is n according to the subframe number (n+m) of the selected uplink subframe used to send the PDSCH information and the correspondence between a subframe number of a downlink subframe used to send DCI and a subframe number of an uplink subframe used to send PDSCH information. In this case, the base station device sends the DCI on a PDCCH of the downlink subframe whose subframe number is n; where n is a natural number, m is an integer greater than or equal to 1, and a specific value of m may be determined in a predefined or preset manner, which is not limited herein.

Step 102. The base station device sends the PDSCH information in the uplink subframe.

In step 102, the base station device sends the PDSCH information in the selected uplink subframe.

It should be noted that, optionally, the uplink subframe used by the base station device to send the PDSCH information is used to send only the PDSCH information, and is not used to send PDCCH information, physical control format indicator channel PCFICH information, or physical hybrid automatic repeat request indicator channel (PHICH) information.

According to the solution of Embodiment 1 of the present invention, a base station device sends downlink control information DCI on a physical downlink control channel PDCCH of a downlink subframe, where the DCI is used to instruct user equipment UE to receive physical downlink shared channel PDSCH information in an uplink subframe; and sends the PDSCH information in the uplink subframe. In this way, the base station can effectively schedule an uplink subframe, and a purpose of transmitting a downlink service by using an uplink subframe is achieved, which not only improves utilization of a wireless spectrum resource corresponding to the uplink subframe, but also effectively diverts load pressure of a wireless spectrum resource corresponding to a downlink subframe. Therefore, overall utilization of wireless spectrum resources of a system is improved.

Embodiment 2

In Embodiment 2, DCI that is in a new format and mentioned in Embodiment 1 of the present invention is described in detail.

That a base station device sends DCI (may be recorded as DCI format 1A') on a PDCCH of a downlink subframe meets:

a quantity of bits of the DCI sent by the base station device is the same as a quantity of bits of DCI format 0/format 1A sent by the base station device, and the DCI sent by the base station device includes a check code CRC and/or a scrambling code, where the CRC and/or the scrambling code is used to instruct the UE to receive the physical downlink shared channel PDSCH information in the uplink subframe.

For example, a CRC of the DCI format 1A' is determined in the following manner:

$$C_k = (a_k + (b_k + x_{rnti,k}) \bmod 2) \bmod 2, k=0, 1, \ldots 15, \text{ where}$$

$a_k$ is a scrambling code, $b_k$ is a CRC, and $x_{rnti,k}$ is a scrambling or masking C-RNTI code.

$a_k$ is used to instruct the UE to receive physical downlink shared channel PDSCH information in an uplink subframe. That is, $a_k$ is used to verify whether the CRC of the DCI is correct, and when a verification result is that the CRC is correct, it is determined that the DCI is used to instruct the UE to receive the physical downlink shared channel PDSCH information in the uplink subframe.

In this way, a length of the DCI in the new format is the same as the quantity of bits of the DCI format 0/format 1A, and the length of the DCI is not increased; therefore, a quantity of times of blind detection performed by the UE is not increased either.

It should be noted that, a CRC of the DCI in the new format is not limited to be obtained in the foregoing masking or scrambling manner, and a scrambled bit is not limited to 16 bits.

A format of the DCI format 1A' includes but is not limited to the following two types:

The first type of format is similar to the DCI format 1A, has only one CRC, and includes an identification flag bit, a centralized and distributed VRB allocation flag bit, an RB allocation bit, an MCS bit, an HARQ process ID, a new data indicator bit, a redundancy version bit, a PUCCH transmission control command bit, and the CRC, which are 44 bits in total.

The identification flag bit occupies 1 bit, may exist or may not exist, and belongs to a redundant bit. The centralized and distributed VRB allocation flag bit occupies 1 bit. The RB allocation bit occupies 13 bits. The MCS bit occupies 5 bits. The HARQ process ID occupies 3 bits. The new data indicator bit occupies 1 bit. The redundancy version bit occupies 2 bits. The PUCCH transmission control command bit occupies 2 bits. The CRC (obtained after scrambling or masking processing by using the scrambling or masking C-RNTI code $x_{rnti,k}$ and the scrambling code $a_k$) occupies 16 bits.

It may be learned that a quantity of bits of the DCI format 1A' is the same as that of the DCI format 0/format 1A, and a difference lies in that scrambling or masking processing has been performed, by using the scrambling or masking C-RNTI code $x_{rnti,k}$ and the scrambling code $a_k$, on a CRC included in the DCI format 1A'.

The second type of format is similar to design of the DCI format 1, may have two codewords, and includes an RB allocation bit, MCS bits of two code blocks, an HARQ process ID, a transmission block-to-codeword mapping indicator bit, a new data indicator bit of a transmission block 1, a redundancy version bit of the transmission block 1, a new data indicator bit of a transmission block 2, a redundancy version bit of the transmission block 2, and a CRC bit.

The RB allocation bit occupies 13 bits. The MCS bit of each of the two code blocks occupies 5 bits, and for saving bits, MSCs of the two code blocks are set to the same. The HARQ process ID occupies 3 bits. The transmission block-to-codeword mapping indicator bit occupies 1 bit. The new data indicator bit of the transmission block 1 occupies 1 bit. The redundancy version bit of the transmission block 1 occupies 2 bits. The new data indicator bit of the transmission block 2 occupies 1 bit. The redundancy version bit of the transmission block 2 occupies 2 bits. The CRC (obtained after scrambling or masking processing by using the scrambling or masking C-RNTI code $x_{rnti,k}$ and the scrambling code $a_k$) bit occupies 16 bits.

It may be learned that there are 44 bits in total, which are the same as the quantity of bits of the DCI format 0/format 1A. A difference lies in that scrambling or masking processing has been performed, by using the scrambling or masking C-RNTI code $x_{rnti,k}$ and the scrambling code $a_k$, on a CRC included in the DCI format 1A'.

Embodiment 2 of the present invention provides DCI in a new format. When detecting the DCI in the new format, UE may determine that a base station device sends PDSCH information in an uplink subframe, and receive, in an uplink subframe corresponding to a subframe number of a downlink subframe in which the DCI is received, the PDSCH information sent by the base station device. Therefore, the base station device flexibly schedules an uplink subframe, and a purpose of transmitting a downlink service by using an uplink subframe is achieved, which not only improves utilization of a wireless spectrum resource corresponding to the uplink subframe, but also effectively diverts load pressure of a wireless spectrum resource corresponding to a downlink subframe. Therefore, overall utilization of a wireless spectrum resource of a system is improved.

Embodiment 3

Figure 2:
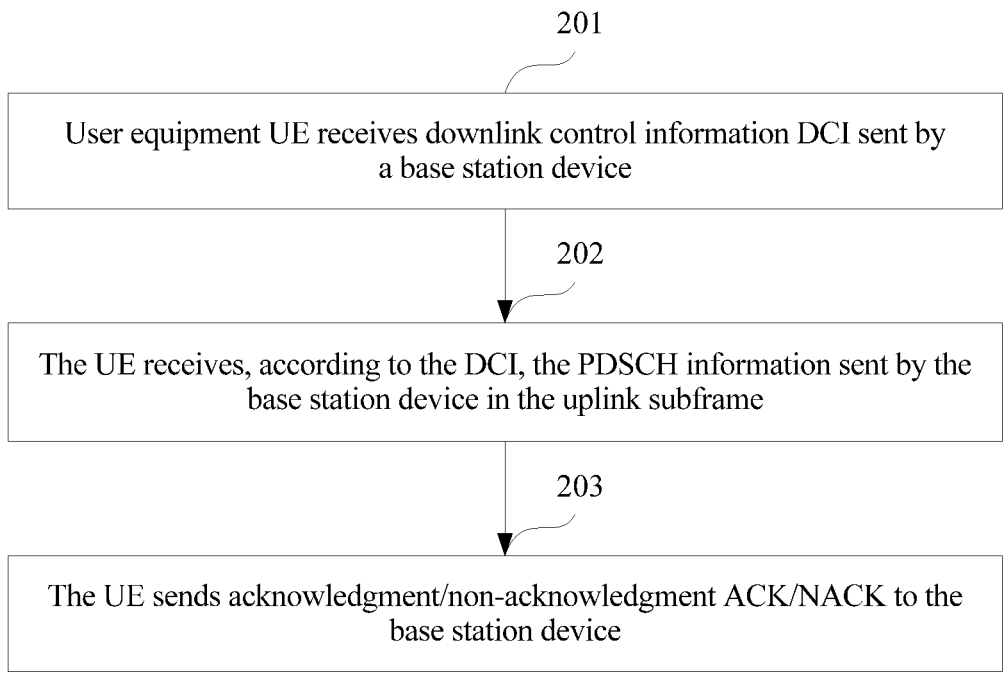
FIG. 2 is a schematic flowchart of a downlink control information receiving method according to Embodiment 3 of the present invention.

As shown in FIG. 2, FIG. 2 is a schematic flowchart of a downlink control information receiving method according to Embodiment 3 of the present invention. The method may be described as follows:

Step 201. User equipment UE receives downlink control information DCI sent by a base station device.

The DCI instructs the UE to receive physical downlink shared channel PDSCH information in an uplink subframe.

In step 201, a manner in which the user equipment UE receives the downlink control information DCI sent by the base station device includes but is not limited to the following:

Manner 1: The UE receives, in a blind detection manner, the DCI sent by the base station device.

Manner 2:

before the UE receives the downlink control information DCI sent by the base station device, the method further includes: receiving, by the user equipment UE, downlink transmission mode information sent by the base station device, where the downlink transmission mode information is used to instruct the UE to detect format information of the downlink control information DCI.

In the LTE release R8, a base station device notifies UE of a downlink transmission mode in advance, so that the UE receives, by using RRC signaling, downlink transmission mode information sent by the base station device. According to the received downlink transmission mode information, the UE not only needs to detect downlink DCI, but also needs to detect uplink DCI (that is, DCI format 0). However, because a quantity of bits of the DCI format 0 is the same as that of DCI format 1A, a DCI format further needs to be determined when the DCI format is being detected.

The UE detects, according to a correspondence between downlink transmission mode information and DCI, DCI corresponding to the received downlink transmission mode information.

In this case, the manner in which the user equipment UE receives the downlink control information DCI sent by the base station device includes:

performing, by the UE according to the downlink transmission mode information, blind detection on the downlink control information DCI sent by the base station device, where the DCI sent by the base station device meets: a quantity of bits of the DCI sent by the base station device is the same as a quantity of bits of DCI format 0/format 1A sent by the base station device, and the DCI sent by the base station device includes a check code CRC and/or a scrambling code, where the CRC and/or the scrambling code is used to instruct the UE to receive the physical downlink shared channel PDSCH information in the uplink subframe.

Specifically, the performing, by the UE according to the downlink transmission mode information, blind detection on the downlink control information DCI sent by the base station device includes:

descrambling or demasking, by the UE each time a piece of DCI is detected, a check code CRC of the detected DCI by using a scrambling or masking C-RNTI code $x_{rnti,k}$, and determining whether the CRC obtained after the descrambling or demasking is $b_k$; and if the obtained CRC is not $b_k$, descrambling or demasking the CRC of the detected DCI by using the scrambling or masking C-RNTI code $x_{rnti,k}$ and a scrambling code $a_k$, and determining, when it is determined that the CRC obtained after the descrambling or demasking is $C_k$ that the DCI sent by the base station device and used to instruct the UE to receive the PDSCH information in the uplink subframe is received.

In an embodiment of the present invention, optionally, the method further includes:

receiving, by the user equipment UE, a notification message sent by the base station device.

The notification message is used to indicate a correspondence between a subframe number of a downlink subframe used to send DCI and a subframe number of an uplink subframe used to send PDSCH information, and the notification message includes at least one or more of a system information block SIB or radio resource control RRC signaling.

In another embodiment of the present invention, after that UE receives DCI sent by a base station device, the method further includes:

determining, by the UE, a subframe number of a downlink subframe in which the DCI is received.

Step 202. The UE receives, according to the DCI, the PDSCH information sent by the base station device in the uplink subframe.

In step 202, the UE determines, according to the correspondence between a subframe number of a downlink subframe used to send DCI and a subframe number of an uplink subframe used to send PDSCH information, and the determined subframe number of the downlink subframe in which the DCI is received, a subframe number of the uplink subframe used by the base station device to send the PDSCH information.

The UE receives, in the uplink subframe corresponding to the determined subframe number of the uplink subframe, the PDSCH information sent by the base station device.

For example, the base station device sends the DCI on a PDCCH of a downlink subframe whose subframe number is n. It is determined, according to the correspondence between a subframe number of a downlink subframe used to send DCI and a subframe number of an uplink subframe used to send PDSCH information, that the base station device sends the PDSCH information in an uplink subframe whose subframe number is (n+m), where n is a natural number, m is an integer greater than or equal to 1, and a specific value of m may be determined in a predefined or preset manner, which is not limited herein.

If the UE detects downlink DCI in the downlink subframe whose subframe number is n, the UE determines, according to the received correspondence between a subframe number of a downlink subframe used to send DCI and a subframe number of an uplink subframe used to send PDSCH information, that the base station device is to send the PDSCH information in the uplink subframe whose subframe number is (n+m) and receive, in the uplink subframe corresponding to the subframe number (n+m) of the uplink subframe, the PDSCH information sent by the base station device.

Step 203. The UE sends acknowledgment/non-acknowledgment ACK/NACK to the base station device.

In step 203, a manner in which the UE sends the ACK/NACK to the base station device includes but is not limited to the following two types:

In the first type, a subframe number of an uplink subframe used to send the ACK/NACK is determined according to the downlink subframe in which the DCI sent by the base station device is received.

Specifically, when receiving the DCI sent by the base station device, the UE determines, according to a correspondence between a subframe number of a downlink subframe used to send DCI and a subframe number of an uplink subframe used to send ACK/NACK, the subframe number of the uplink subframe used to send the ACK/NACK, and sends the ACK/NACK in the uplink subframe corresponding to the determined subframe number of the uplink subframe.

It should be noted that a correspondence between all or any two of a subframe number of a downlink subframe used to send DCI, a subframe number of an uplink subframe used to send PDSCH information, or a subframe number of an uplink subframe used to send ACK/NACK may be predetermined by the base station device, or may be determined by the base station device according to an actual need, or may be obtained through negotiation, which is not limited herein.

For example, if the UE receives the DCI in the downlink subframe whose subframe number is n, the UE determines, according to the correspondence between a subframe number of a downlink subframe used to send DCI and a subframe number of an uplink subframe used to send ACK/NACK, that the ACK/NACK needs to be sent in an uplink subframe corresponding to a subframe number (n+k), where k is greater than or equal to 4.

In the second type, a subframe number of an uplink subframe used to send the ACK/NACK is determined according to the uplink subframe in which the PDSCH information sent by the base station device is received.

Specifically, when receiving the PDSCH information sent by the base station device, the UE determines, according to a correspondence between a subframe number of an uplink subframe used to send PDSCH information and a subframe number of an uplink subframe used to send ACK/NACK, the subframe number of the uplink subframe used to send the ACK/NACK, and sends the ACK/NACK in the uplink subframe corresponding to the determined subframe number of the uplink subframe.

It should be noted that a correspondence between all or any two of a subframe number of a downlink subframe used to send DCI, a subframe number of an uplink subframe used to send PDSCH information, or a subframe number of an uplink subframe used to send ACK/NACK may be predetermined by the base station device, or may be determined by the base station device according to an actual need, or may be obtained through negotiation, which is not limited herein.

For example, if the UE receives the PDSCH information in the uplink subframe whose subframe number is n, the UE determines, according to the correspondence between a subframe number of an uplink subframe used to send PDSCH information and a subframe number of an uplink subframe used to send ACK/NACK, that the ACK/NACK needs to be sent in an uplink subframe corresponding to a subframe number (n+k), where k is greater than or equal to 4.

When determining that the uplink subframe corresponding to the subframe number of the uplink subframe used to send the ACK/NACK has been scheduled for sending a downlink service, the UE reselects an uplink subframe that has not been scheduled for sending a downlink service and whose difference from the determined subframe number of the uplink subframe is the smallest, and sends the ACK/NACK in the reselected uplink subframe.

Specifically, the determined subframe number (n+k) used to send the ACK/NACK may be corresponding to an uplink subframe used to send a downlink service; in this case, it is required to find the first uplink subframe from subframes whose subframe numbers are subsequent to the subframe number (n+k), and the uplink subframe is used to send an uplink service, and the ACK/NACK is sent by using the found first uplink subframe.

That is, once a conflict between an uplink resource and a downlink resource occurs, the base station device may avoid the conflict by using a resource scheduling algorithm.

By using the solution according to Embodiment 3 of the present invention, user equipment receives DCI sent by a base station device, and receives, according to the DCI, PDSCH information sent by the base station device in an uplink subframe. Therefore, the base station device flexibly schedules an uplink subframe, and a purpose of transmitting a downlink service by using an uplink subframe is achieved, which not only improves utilization of a wireless spectrum resource corresponding to the uplink subframe, but also effectively diverts load pressure of a wireless spectrum resource corresponding to a downlink subframe. Therefore, overall utilization of a wireless spectrum resource of a system is improved.

Embodiment 4

Figure 3:
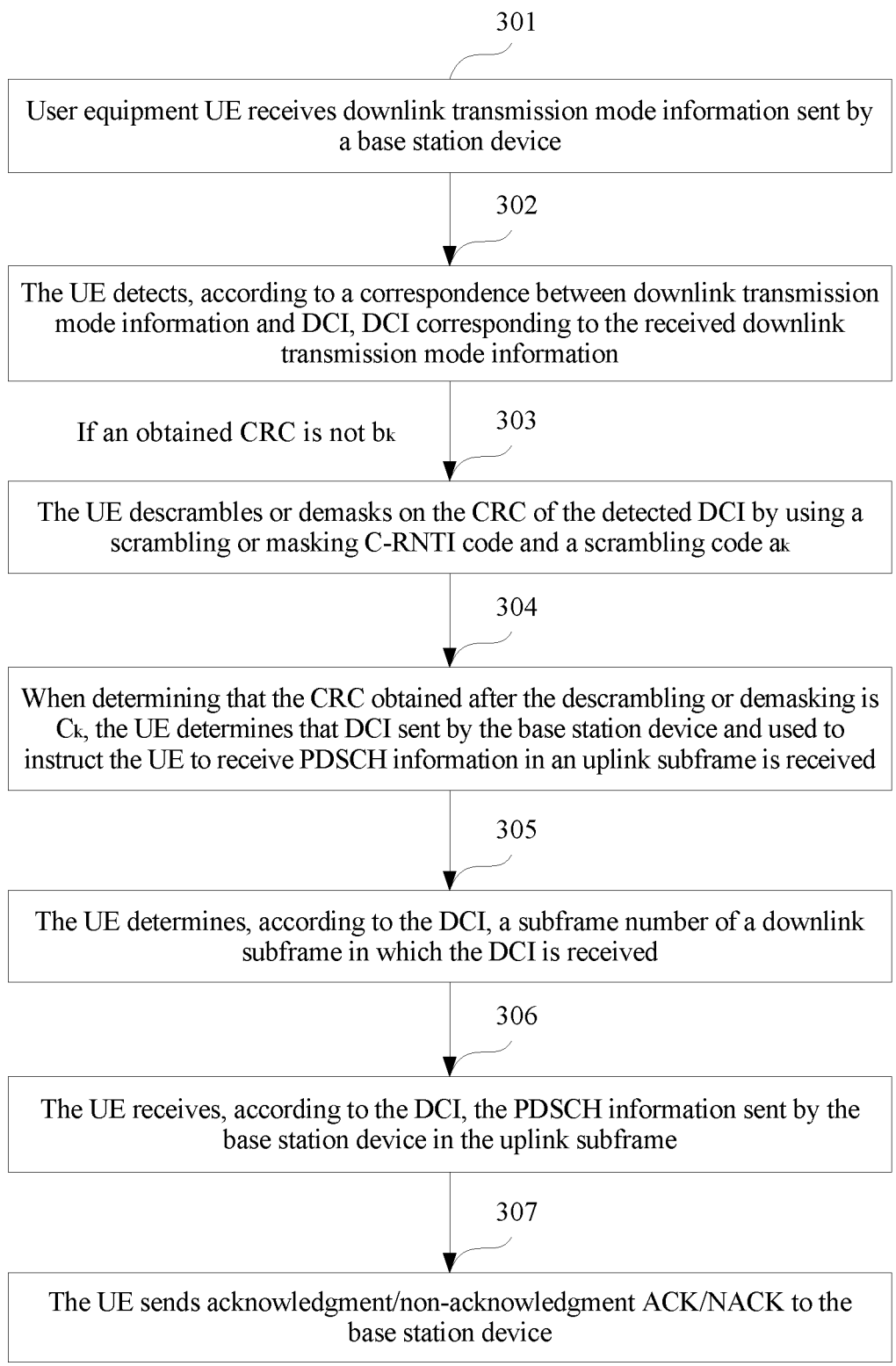
FIG. 3 is a schematic flowchart of a downlink control information receiving method according to Embodiment 4 of the present invention.

As shown in FIG. 3, FIG. 3 is a schematic flowchart of a downlink control information receiving method according to Embodiment 4 of the present invention. The method may be described as follows:

Step 301. User equipment UE receives downlink transmission mode information sent by a base station device.

The downlink transmission mode information is used to instruct the UE to detect format information of downlink control information DCI.

In step 301, in the LTE release R8, a base station device notifies UE of a downlink transmission mode in advance, so that the UE receives, by using RRC signaling, downlink transmission mode information sent by the base station device. According to the received downlink transmission mode information, the UE not only needs to detect downlink DCI, but also needs to detect uplink DCI (that is, DCI format 0). However, because a quantity of bits of the DCI format 0 is the same as that of DCI format 1A, a DCI format further needs to be determined when the DCI format is being detected.

Step 302. The UE detects, according to a correspondence between downlink transmission mode information and DCI, DCI corresponding to the received downlink transmission mode information.

In step 302, the UE performs, according to the downlink transmission mode information, blind detection on downlink control information DCI sent by the base station device, where the DCI sent by the base station device meets: a quantity of bits of the DCI sent by the base station device is the same as a quantity of bits of the DCI format 0/format 1A, and the DCI sent by the base station device includes a check code CRC and/or a scrambling code, where the CRC and/or the scrambling code is used to instruct the UE to receive physical downlink shared channel PDSCH information in an uplink subframe.

Specifically, each time the UE detects a piece of DCI, the UE descrambles or demasks a check code CRC of the detected DCI by using a scrambling or masking C-RNTI code $x_{rnti,k}$, and determines whether the CRC obtained after the descrambling or demasking is $b_k$; and if the obtained CRC is not $b_k$, step 303 is performed; otherwise, the DCI is obtained by detection in Manner 1 in step 201, and then subsequent content in step 202 and step 203 is performed.

Step 303. The UE descrambles or demasks a CRC of the detected DCI by using a scrambling or masking C-RNTI code $x_{rnti,k}$ and a scrambling code $a_k$.

Step 304. When determining that the CRC obtained after the descrambling or demasking is $C_k$, the UE determines that DCI sent by the base station device and used to instruct the UE to receive PDSCH information in an uplink subframe is received.

Optionally, a subframe number of the uplink subframe used to instruct the UE to receive the PDSCH information is the same as a subframe number of a downlink subframe used by the base station device to send the DCI.

Step 305. The UE determines, according to the DCI, a subframe number of a downlink subframe in which the DCI is received.

Step 306. The UE receives, according to the DCI, the PDSCH information sent by the base station device in the uplink subframe.

In step 306, the UE determines, according to a correspondence between a subframe number of a downlink subframe used to send DCI and a subframe number of an uplink subframe used to send PDSCH information, and the determined subframe number of the downlink subframe in which the DCI is received, the subframe number of the uplink subframe used by the base station device to send the PDSCH information.

The UE receives, in the uplink subframe corresponding to the determined subframe number of the uplink subframe, the PDSCH information sent by the base station device.

For example, the base station device sends the DCI on a PDCCH of a downlink subframe whose subframe number is n. It is determined, according to the correspondence between a subframe number of a downlink subframe used to send DCI and a subframe number of an uplink subframe used to send PDSCH information, that the base station device sends the PDSCH information in an uplink subframe whose subframe number is (n+m), where n is a natural number, m is an integer greater than or equal to 1, and a specific value of m may be determined in a predefined or preset manner, which is not limited herein.

It should be noted that, the value of m may also be 0, that is, the base station device sends the DCI on the PDCCH of the downlink subframe whose subframe number is n, and at the same time, sends the PDSCH information in an uplink subframe whose subframe number is n.

If the UE detects downlink DCI in the downlink subframe whose subframe number is n, the UE determines, according to the received correspondence between a subframe number of a downlink subframe used to send DCI and a subframe number of an uplink subframe used to send PDSCH information, that the base station device is to send the PDSCH information in the uplink subframe whose subframe number is (n+m) and receive, in the uplink subframe corresponding to the subframe number (n+m) of the uplink subframe, the PDSCH information sent by the base station device.

Step 307. The UE sends acknowledgment/non-acknowledgment ACK/NACK to the base station device.

In step 307, a manner in which the UE sends the ACK/NACK to the base station device includes but is not limited to the following two types:

In the first type, a subframe number of an uplink subframe used to send the ACK/NACK is determined according to the downlink subframe in which the DCI sent by the base station device is received.

Specifically, when receiving the DCI sent by the base station device, the UE determines, according to a correspondence between a subframe number of a downlink subframe used to send DCI and a subframe number of an uplink subframe used to send ACK/NACK, the subframe number of the uplink subframe used to send the ACK/NACK, and sends the ACK/NACK in the uplink subframe corresponding to the determined subframe number of the uplink subframe.

It should be noted that a correspondence between all or any two of a subframe number of a downlink subframe used to send DCI, a subframe number of an uplink subframe used to send PDSCH information, or a subframe number of an uplink subframe used to send ACK/NACK may be predetermined by the base station device, or may be determined by the base station device according to an actual need, or may be obtained through negotiation, which is not limited herein.

For example, if the UE receives the DCI in the downlink subframe whose subframe number is n, the UE determines, according to the correspondence between a subframe number of a downlink subframe used to send DCI and a subframe number of an uplink subframe used to send ACK/NACK, that the ACK/NACK needs to be sent in an uplink subframe corresponding to a subframe number (n+k), where k is greater than or equal to 4.

In the second type, a subframe number of an uplink subframe used to send the ACK/NACK is determined according to the uplink subframe in which the PDSCH information sent by the base station device is received.

Specifically, when receiving the PDSCH information sent by the base station device, the UE determines, according to a correspondence between a subframe number of an uplink subframe used to send PDSCH information and a subframe number of an uplink subframe used to send ACK/NACK, the subframe number of the uplink subframe used to send the ACK/NACK, and sends the ACK/NACK in the uplink subframe corresponding to the determined subframe number of the uplink subframe.

It should be noted that a correspondence between all or any two of a subframe number of a downlink subframe used to send DCI, a subframe number of an uplink subframe used to send PDSCH information, or a subframe number of an uplink subframe used to send ACK/NACK may be predetermined by the base station device, or may be determined by the base station device according to an actual need, or may be obtained through negotiation, which is not limited herein.

For example, if the UE receives the PDSCH information in the uplink subframe whose subframe number is n, the UE determines, according to the correspondence between a subframe number of an uplink subframe used to send PDSCH information and a subframe number of an uplink subframe used to send ACK/NACK, that the ACK/NACK needs to be sent in an uplink subframe corresponding to a subframe number (n+k), where k is greater than or equal to 4.

When determining that the uplink subframe corresponding to the subframe number of the uplink subframe used to send the ACK/NACK has been scheduled for sending a downlink service, the UE reselects an uplink subframe that has not been scheduled for sending a downlink service and whose difference from the determined subframe number of the uplink subframe is the smallest, and sends the ACK/NACK in the reselected uplink subframe.

Specifically, the determined subframe number (n+k) used to send the ACK/NACK may be corresponding to an uplink subframe used to send a downlink service; in this case, it is required to find the first closet uplink subframe from subframes whose subframe numbers are subsequent to the subframe number (n+k), and the uplink subframe is used to send an uplink service, and the ACK/NACK is sent by using the found first closet uplink subframe.

That is, once a conflict between an uplink resource and a downlink resource occurs, the base station device may avoid the conflict by using a resource scheduling algorithm.

By using the solution according to Embodiment 4 of the present invention, user equipment receives DCI sent by a base station device, and receives, according to the DCI, PDSCH information sent by the base station device in an uplink subframe. Therefore, the base station device flexibly schedules an uplink subframe, and a purpose of transmitting a downlink service by using an uplink subframe is achieved, which not only improves utilization of a wireless spectrum resource corresponding to the uplink subframe, but also effectively diverts load pressure of a wireless spectrum resource corresponding to a downlink subframe. Therefore, overall utilization of a wireless spectrum resource of a system is improved.

Embodiment 5

Figure 4:
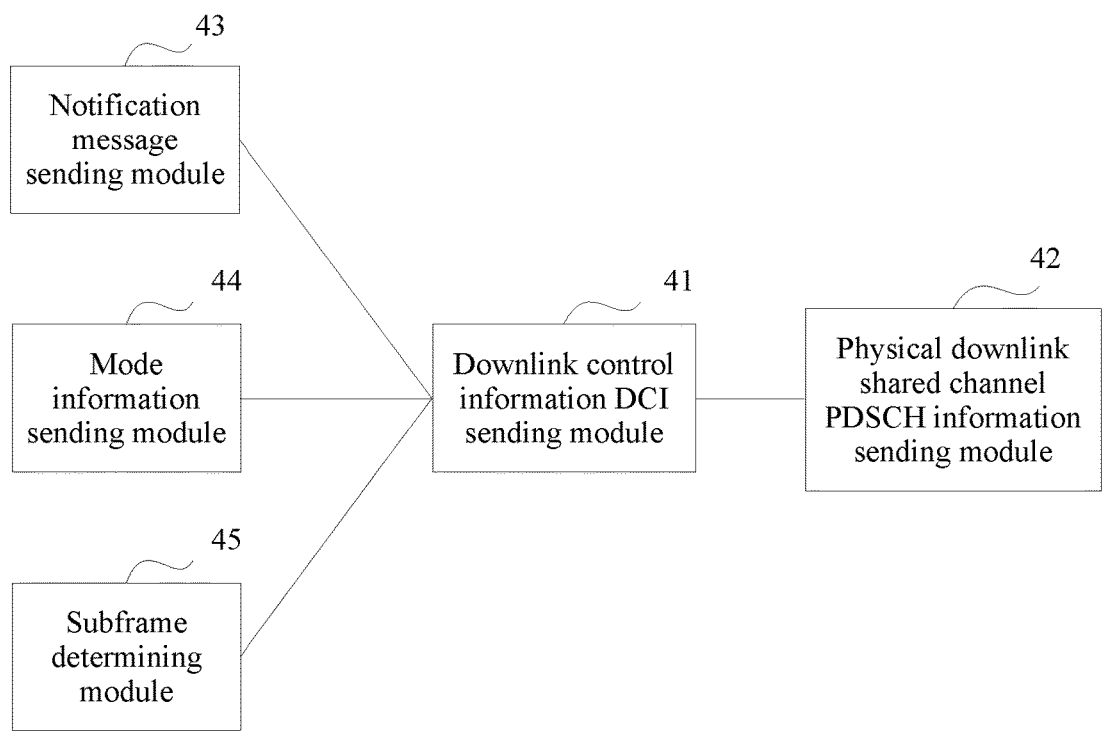
FIG. 4 is a schematic structural diagram of a downlink control information sending device according to Embodiment 5 of the present invention.

As shown in FIG. 4, FIG. 4 is a schematic structural diagram of a downlink control information sending device according to Embodiment 5 of the present invention. The sending device provided in Embodiment 5 of the present invention is capable of performing the methods in Embodiment 1 of the present invention and Embodiment 2 of the present invention, and the sending device includes: a downlink control information DCI sending module 41 and a physical downlink shared channel PDSCH information sending module 42.

The downlink control information DCI sending module 41 is configured to send downlink control information DCI on a physical downlink control channel PDCCH of a downlink subframe, where the DCI is used to instruct user equipment UE to receive physical downlink shared channel PDSCH information in an uplink subframe.

The physical downlink shared channel PDSCH information sending module 42 is configured to send the PDSCH information in the uplink subframe.

Optionally, the device further includes a notification message sending module 43.

The notification message sending module 43 is configured to send a notification message to the user equipment UE, where the notification message is used to indicate a correspondence between a subframe number of a downlink subframe used to send DCI and a subframe number of an uplink subframe used to send PDSCH information, and the notification message includes at least one or more of a system information block SIB or radio resource control RRC signaling.

In another embodiment of the present invention, that the sending device sends the DCI on the PDCCH of the downlink subframe meets: a quantity of bits of the DCI sent by the sending device is the same as a quantity of bits of DCI format 0/format 1A sent by the sending device, and the DCI sent by the sending device includes a check code CRC and/or a scrambling code, where the CRC and/or the scrambling code is used to instruct the UE to receive the physical downlink shared channel PDSCH information in the uplink subframe.

Optionally, a subframe number of the uplink subframe used to instruct the UE to receive the PDSCH information is the same as a subframe number of the downlink subframe used by the sending device to send the DCI.

Optionally, the sending device further includes a mode information sending module 44.

The mode information sending module 44 is configured to send downlink transmission mode information to the user equipment UE before the DCI sending module 41 sends the downlink control information DCI on the physical downlink control channel PDCCH of the downlink subframe, where the downlink transmission mode information is used to instruct the UE to detect format information of the downlink control information DCI.

Specifically, the mode information sending module 44 is specifically configured to send the downlink transmission mode information to the user equipment UE by using radio resource control RRC signaling.

Optionally, the sending device further includes a subframe determining module 45.

The subframe determining module 45 is configured to: before the DCI sending module 41 sends the downlink control information DCI on the physical downlink control channel PDCCH of the downlink subframe, select an uplink subframe that can be used to send the PDSCH information, and determine, according to a correspondence between a subframe number of a downlink subframe used to send DCI and a subframe number of an uplink subframe used to send PDSCH information, a subframe number that is of a downlink subframe and corresponding to a subframe number of the selected uplink subframe used to send the PDSCH information.

The DCI sending module 41 is specifically configured to send the downlink control information DCI on the physical downlink control channel PDCCH of the downlink subframe corresponding to the determined subframe number of the downlink subframe.

The PDSCH sending module 42 is specifically configured to send the PDSCH information in the selected uplink subframe.

Optionally, the uplink subframe used by the base station device to send the PDSCH information is used to send only the PDSCH information, and is not used to send PDCCH information, physical control format indicator channel PCFICH information, or physical hybrid automatic repeat request indicator channel PHICH information.

Optionally, the uplink subframe is carried on an uplink carrier, the downlink subframe is carried on a downlink carrier, and the uplink carrier and the downlink carrier are wireless spectrum resources configured in a frequency division duplex FDD system.

It should be noted that the sending device provided in Embodiment 5 of the present invention may be implemented in a hardware manner, or may be implemented in a software manner, which is not limited herein. In addition, the sending device provided in Embodiment 5 of the present invention may be a logical unit inside a base station device, or a logical component inside another similar device having a function of a base station.

By using the sending device, a base station device can flexibly schedule an uplink subframe, and a purpose of transmitting a downlink service by using an uplink subframe is achieved, which not only improves utilization of a wireless spectrum resource corresponding to the uplink subframe, but also effectively diverts load pressure of a wireless spectrum resource corresponding to a downlink subframe. Therefore, overall utilization of wireless spectrum resources of a system is improved.

Embodiment 6

Figure 5:
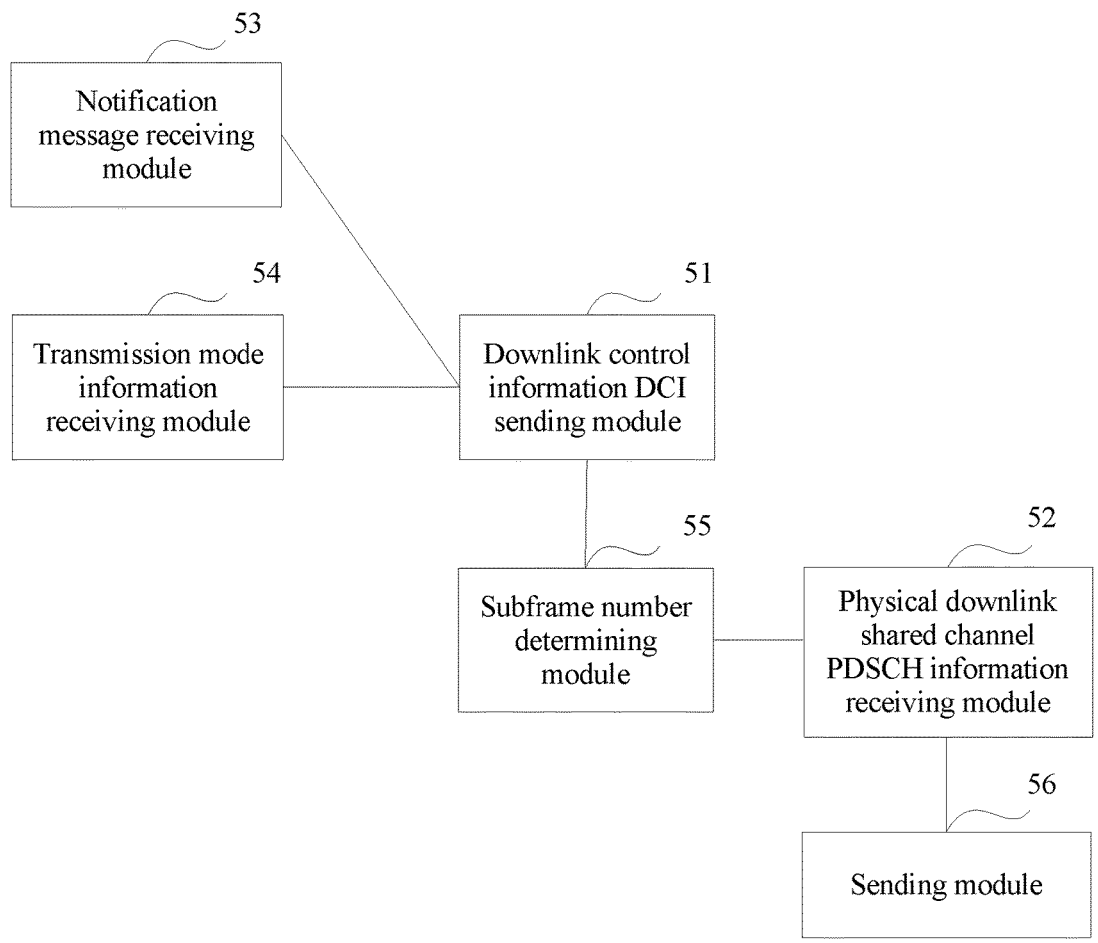
FIG. 5 is a schematic structural diagram of a downlink control information receiving device according to Embodiment 6 of the present invention.

As shown in FIG. 5, FIG. 5 is a schematic structural diagram of a downlink control information receiving device according to Embodiment 6 of the present invention. The receiving device according to Embodiment 6 of the present invention has functions of performing Embodiment 3 of the present invention and Embodiment 4 of the present invention, and the receiving device includes: a downlink control information DCI receiving module 51 and a physical downlink shared channel PDSCH information receiving module 52.

The downlink control information DCI receiving module 51 is configured to receive downlink control information DCI sent by a base station device, where the DCI instructs UE to receive physical downlink shared channel PDSCH information in an uplink subframe.

The physical downlink shared channel PDSCH information receiving module 52 is configured to receive, according to the DCI received by the DCI receiving module, the PDSCH information sent by the base station device in the uplink subframe.

Optionally, the receiving device further includes a notification message receiving module 53.

The notification message receiving module 53 is configured to receive a notification message sent by the base station device, where the notification message is used to indicate a correspondence between a subframe number of a downlink subframe used to send DCI and a subframe number of an uplink subframe used to send PDSCH information, and the notification message includes at least one or more of a system information block SIB or radio resource control RRC signaling.

Specifically, the DCI receiving module 51 is specifically configured to receive, in a blind detection manner, the DCI sent by the base station device.

Optionally, the receiving device further includes a transmission mode information receiving module 54.

The transmission mode information receiving module 54 is configured to receive, before the DCI receiving module receives the downlink control information DCI sent by the base station device, downlink transmission mode information sent by the base station device, where the downlink transmission mode information is used to instruct the UE to detect format information of the downlink control information DCI.

Specifically, the DCI receiving module 51 is specifically configured to: perform, according to the downlink transmission mode information, blind detection on the downlink control information DCI sent by the base station device, where the DCI sent by the base station device meets: a quantity of bits of the DCI sent by the base station device is the same as a quantity of bits of DCI format 0/format 1A sent by the base station device, and the DCI sent by the base station device includes a check code CRC and/or a scrambling code, where the CRC and/or the scrambling code is used to instruct the UE to receive the physical downlink shared channel PDSCH information in the uplink subframe.

The DCI receiving module 51 is specifically configured to: descramble or demask, each time a piece of DCI is detected, a check code CRC of the detected DCI by using a scrambling or masking C-RNTI code $x_{rnti,k}$ and determine whether the CRC obtained after the descrambling or demasking is $b_k$; and if the obtained CRC is not $b_k$, descramble or demask the CRC of the detected DCI by using the scrambling or masking C-RNTI code $x_{rnti,k}$ and a scrambling code $a_k$, and determine, when it is determined that the CRC obtained after the descrambling or demasking is $C_k$, that the DCI sent by the base station device and used to instruct the UE to receive the PDSCH information in the uplink subframe is received.

Optionally, the receiving device further includes a subframe number determining module 55.

The subframe number determining module 55 is configured to determine, after the DCI receiving module receives the DCI sent by the base station device, a subframe number of a downlink subframe in which the DCI is received.

The PDSCH information receiving module 52 is specifically configured to: determine, according to the correspondence between a subframe number of a downlink subframe used to send DCI and a subframe number of an uplink subframe used to send PDSCH information, and the determined subframe number of the downlink subframe in which the DCI is received, a subframe number of the uplink subframe used by the base station device to send the PDSCH information; and receive, in the uplink subframe corresponding to the determined subframe number of the uplink subframe, the PDSCH information sent by the base station device.

Optionally, the receiving device further includes a sending module 56.

The sending module 56 is configured to send acknowledgment/non-acknowledgment ACK/NACK to the base station device when the PDSCH information receiving module receives the PDSCH information.

Specifically, the sending module 56 is specifically configured to: determine, according to a correspondence between a subframe number of a downlink subframe used to receive DCI and a subframe number of an uplink subframe used to send ACK/NACK, a subframe number of an uplink subframe used to send the ACK/NACK, and send the ACK/NACK in the uplink subframe corresponding to the determined subframe number of the uplink subframe.

The sending module 56 is specifically configured to: determine, according to a correspondence between a subframe number of an uplink subframe used to receive PDSCH information and a subframe number of an uplink subframe used to send ACK/NACK, a subframe number of an uplink subframe used to send the ACK/NACK, and send the ACK/NACK in the uplink subframe corresponding to the determined subframe number of the uplink subframe.

The sending module 56 is specifically configured to: reselect, when it is determined that the uplink subframe corresponding to the subframe number of the uplink subframe used to send the ACK/NACK has been scheduled for sending a downlink service, an uplink subframe that has not been scheduled for sending a downlink service and whose difference from the determined subframe number of the uplink subframe is the smallest, and send the ACK/NACK in the reselected uplink subframe.

It should be noted that the receiving device provided in Embodiment 6 of the present invention may be implemented in a hardware manner, or may be implemented in a software manner, which is not limited herein. In addition, the receiving device provided in Embodiment 6 of the present invention may be a logical unit inside user equipment, or a logical component inside another mobile device.

Through cooperation between the sending device according to Embodiment 5 of the present invention and the receiving device according to Embodiment 6 of the present invention, a base station device can flexibly schedule an uplink subframe, and a purpose of transmitting a downlink service by using an uplink subframe is achieved, which not only improves utilization of a wireless spectrum resource corresponding to the uplink subframe, but also effectively diverts load pressure of a wireless spectrum resource corresponding to a downlink subframe. Therefore, overall utilization of wireless spectrum resources of a system is improved.

Embodiment 7

Figure 6:
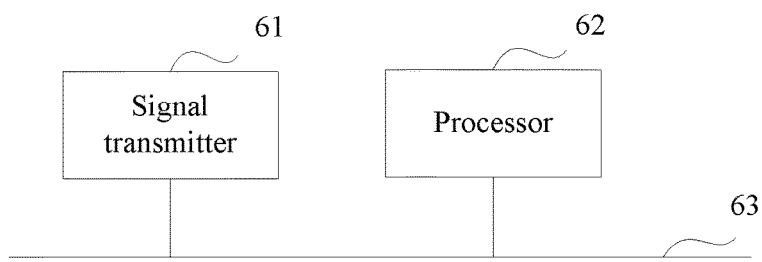
FIG. 6 is a schematic structural diagram of a downlink control information sending device according to Embodiment 7 of the present invention.

As shown in FIG. 6, FIG. 6 is a schematic structural diagram of a downlink control information sending device according to Embodiment 7 of the present invention. The sending device according to Embodiment 7 of the present invention is capable of performing the methods in Embodiment 1 of the present invention and Embodiment 2 of the present invention, and the sending device includes: a signal transmitter 61 and a processor 62, where the signal transmitter 61 and the processor 62 are connected by using a communications bus 63.

The signal transmitter 61 is configured to send downlink control information DCI on a physical downlink control channel PDCCH of a downlink subframe, where the DCI is used to instruct user equipment UE to receive physical downlink shared channel PDSCH information in an uplink subframe.

The signal transmitter 61 is further configured to send the PDSCH information in the uplink subframe.

Optionally, the signal transmitter 61 is further configured to send a notification message to the user equipment UE, where the notification message is used to indicate a correspondence between a subframe number of a downlink subframe used to send DCI and a subframe number of an uplink subframe used to send PDSCH information, and the notification message includes at least one or more of a system information block SIB or radio resource control RRC signaling.

Optionally, that the sending device sends the DCI on the PDCCH of the downlink subframe meets: a quantity of bits of the DCI sent by the sending device is the same as a quantity of bits of DCI format 0/format 1A sent by the sending device, and the DCI sent by the sending device includes a check code CRC and/or a scrambling code, where the CRC and/or the scrambling code is used to instruct the UE to receive the physical downlink shared channel PDSCH information in the uplink subframe.

Optionally, a subframe number of the uplink subframe used to instruct the UE to receive the PDSCH information is the same as a subframe number of the downlink subframe used by the base station device to send the DCI.

Optionally, the signal transmitter 61 is further configured to send downlink transmission mode information to the user equipment UE before sending the downlink control information DCI on the physical downlink control channel PDCCH of the downlink subframe, where the downlink transmission mode information is used to instruct the UE to detect format information of the downlink control information DCI.

Specifically, the signal transmitter 61 is specifically configured to send the downlink transmission mode information to the user equipment UE by using radio resource control RRC signaling.

Optionally, the sending device further includes the processor 62.

The processor 62 is configured to: before the downlink control information DCI is sent on the physical downlink control channel PDCCH of the downlink subframe, select an uplink subframe that can be used to send the PDSCH information, and determine, according to the correspondence between a subframe number of a downlink subframe used to send DCI and a subframe number of an uplink subframe used to send PDSCH information, a subframe number that is of a downlink subframe and corresponding to a subframe number of the selected uplink subframe used to send the PDSCH information.

The signal transmitter 61 is specifically configured to send the downlink control information DCI on the physical downlink control channel PDCCH of the downlink subframe corresponding to the determined subframe number of the downlink subframe.

The signal transmitter 61 is further specifically configured to send the PDSCH information in the selected uplink subframe.

Optionally, the uplink subframe used by the sending device to send the PDSCH information is used to send only the PDSCH information, and is not used to send PDCCH information, physical control format indicator channel PCFICH information, or physical hybrid automatic repeat request indicator channel PHICH information.

Optionally, the uplink subframe is carried on an uplink carrier, the downlink subframe is carried on a downlink carrier, and the uplink carrier and the downlink carrier are wireless spectrum resources configured in a frequency division duplex FDD system.

It should be noted that the processor 62 may be a general central processing unit (CPU), a microprocessor, an application-specific integrated circuit (Application-Specific Integrated Circuit, ASIC), or one or more integrated circuits used to control execution of programs in the solutions of the present invention.

By using the sending device, a base station device can flexibly schedule an uplink subframe, and a purpose of transmitting a downlink service by using an uplink subframe is achieved, which not only improves utilization of a wireless spectrum resource corresponding to the uplink subframe, but also effectively diverts load pressure of a wireless spectrum resource corresponding to a downlink subframe. Therefore, overall utilization of wireless spectrum resources of a system is improved.

Embodiment 8

Figure 7:
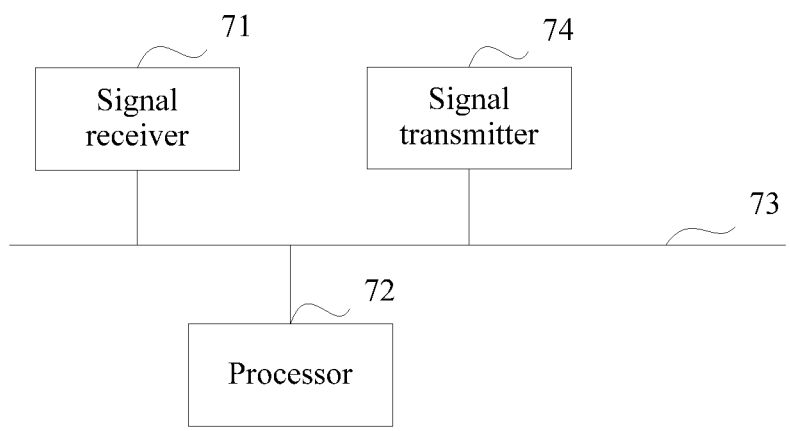
FIG. 7 is a schematic structural diagram of a downlink control information receiving device according to Embodiment 8 of the present invention.

As shown in FIG. 7, FIG. 7 is a schematic structural diagram of a downlink control information receiving device according to Embodiment 8 of the present invention. The receiving device according to Embodiment 8 of the present invention is capable of performing the methods in Embodiment 3 of the present invention and Embodiment 4 of the present invention, and the receiving device includes: a signal receiver 71 and a processor 72, where the signal receiver 71 and the processor 72 are connected by using a communications bus 73.

The signal receiver 71 is configured to receive downlink control information DCI sent by a base station device, where the DCI instructs the UE to receive physical downlink shared channel PDSCH information in an uplink subframe.

The signal receiver 71 is further configured to receive, according to the DCI, the PDSCH information sent by the base station device in the uplink subframe.

Optionally, the signal receiver 71 is further configured to receive a notification message sent by the base station device, where the notification message is used to indicate a correspondence between a subframe number of a downlink subframe used to send DCI and a subframe number of an uplink subframe used to send PDSCH information, and the notification message includes at least one or more of a system information block SIB or radio resource control RRC signaling.

Specifically, the signal receiver 71 is specifically configured to receive, in a blind detection manner, the DCI sent by the base station device.

Optionally, the signal receiver 71 is further configured to receive, before receiving the downlink control information DCI sent by the base station device, downlink transmission mode information sent by the base station device, where the downlink transmission mode information is used to instruct the UE to detect format information of the downlink control information DCI.

Specifically, the signal receiver 71 is specifically configured to perform, according to the downlink transmission mode information, blind detection on the downlink control information DCI sent by the base station device, where the DCI sent by the base station device meets: a quantity of bits of the DCI sent by the base station device is the same as a quantity of bits of DCI format 0/format 1A sent by the base station device, and the DCI sent by the base station device includes a check code CRC and/or a scrambling code, where the CRC and/or the scrambling code is used to instruct the UE to receive the physical downlink shared channel PDSCH information in the uplink subframe.

Specifically, the signal receiver 71 is specifically configured to: descramble or demask, each time a piece of DCI is detected, a check code CRC of the detected DCI by using a scrambling or masking C-RNTI code $x_{rnti,k}$, and determine whether the CRC obtained after the descrambling or demasking is $b_k$; and if the obtained CRC is not $b_k$, descramble or demask the CRC of the detected DCI by using the scrambling or masking C-RNTI code $x_{rnti,k}$ and a scrambling code $a_k$, and determine, when it is determined that the CRC obtained after the descrambling or demasking is $C_k$, that the DCI sent by the base station device and used to instruct the UE to receive the PDSCH information in the uplink subframe is received.

Optionally, the receiving device further includes the processor 72.

The processor 72 is configured to determine, after the signal receiver receives the DCI sent by the base station device, a subframe number of a downlink subframe in which the DCI is received.

The signal receiver 71 is specifically configured to: determine, according to the correspondence between a subframe number of a downlink subframe used to send DCI and a subframe number of an uplink subframe used to send PDSCH information, and the determined subframe number of the downlink subframe in which the DCI is received, a subframe number of the uplink subframe used by the base station device to send the PDSCH information; and receive, in the uplink subframe corresponding to the determined subframe number of the uplink subframe, the PDSCH information sent by the base station device.

Optionally, the receiving device further includes a signal transmitter 74.

The signal transmitter 74 is configured to send acknowledgment/non-acknowledgment ACK/NACK to the base station device when the signal receiver receives the PDSCH information.

Specifically, the signal transmitter 74 is specifically configured to: determine, according to a correspondence between a subframe number of a downlink subframe used to receive DCI and a subframe number of an uplink subframe used to send ACK/NACK, a subframe number of an uplink subframe used to send the ACK/NACK, and send the ACK/NACK in the uplink subframe corresponding to the determined subframe number of the uplink subframe.

Specifically, the signal transmitter 74 is specifically configured to: determine, according to a correspondence between a subframe number of an uplink subframe used to receive PDSCH information and a subframe number of an uplink subframe used to send ACK/NACK, a subframe number of an uplink subframe used to send the ACK/NACK, and send the ACK/NACK in the uplink subframe corresponding to the determined subframe number of the uplink subframe.

Specifically, the signal transmitter 74 is specifically configured to: reselect, when it is determined that the uplink subframe corresponding to the subframe number of the uplink subframe used to send the ACK/NACK has been scheduled for sending a downlink service, an uplink subframe that has not been scheduled for sending a downlink service and whose difference from the determined subframe number of the uplink subframe is the smallest, and send the ACK/NACK in the reselected uplink subframe.

It should be noted that the processor 72 may be a general central processing unit (CPU), a microprocessor, an application-specific integrated circuit (ASIC), or one or more integrated circuits used to control execution of programs in the solutions of the present invention.

Through cooperation between the sending device according to Embodiment 7 of the present invention and the receiving device according to Embodiment 8 of the present invention, a base station device can flexibly schedule an uplink subframe, and a purpose of transmitting a downlink service by using an uplink subframe is achieved, which not only improves utilization of a wireless spectrum resource corresponding to the uplink subframe, but also effectively diverts load pressure of a wireless spectrum resource corresponding to a downlink subframe. Therefore, overall utilization of wireless spectrum resources of a system is improved.

A person skilled in the art should understand that the embodiments of the present invention may be provided as a method, an apparatus (device), or a computer program product. Therefore, the present invention may use a form of hardware only embodiments, software only embodiments, or embodiments with a combination of software and hardware. Moreover, the present invention may use a form of a computer program product that is implemented on one or more computer-usable storage media (including but not limited to a disk memory, a CD-ROM, an optical memory, and the like) that include computer-usable program code.

The present invention is described with reference to the flowcharts and/or block diagrams of the method, the apparatus (device), and the computer program product according to the embodiments of the present invention. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may also be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may also be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Although some preferred embodiments of the present invention have been described, persons skilled in the art can make changes and modifications to these embodiments once they learn the basic inventive concept. Therefore, the following claims are intended to be construed as to cover the preferred embodiments and all changes and modifications falling within the scope of the present invention.

Obviously, a person skilled in the art can make various modifications and variations to the present invention without departing from the spirit and scope of the present invention. The present invention is intended to cover these modifications and variations provided that they fall within the scope of protection defined by the following claims and their equivalent technologies.

What is claimed is:

1. A downlink control information sending method, comprising:

sending, by a base station device, downlink control information (DCI) on a physical downlink control channel (PDCCH) of a downlink subframe, wherein the DCI is used to instruct user equipment (UE) to receive physical downlink shared channel (PDSCH) information in an uplink subframe; and sending, by the base station device, the PDSCH information in the uplink subframe.

2. The method according to claim 1, wherein the method further comprises:

sending, by the base station device, a notification message to the UE, wherein the notification message is used to indicate a correspondence between a subframe number of a downlink subframe used to send DCI and a subframe number of an uplink subframe used to send PDSCH information, and the notification message comprises a system information block (SIB) or radio resource control (RRC) signaling.

3. The method according to claim 1, wherein the sending, by a base station device, DCI on a PDCCH of a downlink subframe meets: a quantity of bits of the DCI sent by the base station device is the same as a quantity of bits of DCI format 0/format 1A sent by the base station, and the DCI sent by the base station device comprises a CRC and/or a scrambling code, wherein the CRC and/or the scrambling code is used to instruct the UE to receive the PDSCH information in the uplink subframe.

4. The method according to claim 1, wherein before the sending, by a base station device, DCI on a PDCCH of a downlink subframe, the method further comprises:

selecting, by the base station device, an uplink subframe that can be used to send the PDSCH information, and determining, according to a correspondence between a subframe number of a downlink subframe used to send DCI and a subframe number of an uplink subframe used to send PDSCH information, a subframe number that is of a downlink subframe and corresponding to a subframe number of the selected uplink subframe used to send the PDSCH information;

the sending, by a base station device, downlink control information DCI on a PDCCH of a downlink subframe comprises:

sending, by the base station device, the downlink control information DCI on the PDCCH of the downlink subframe corresponding to the determined subframe number of the downlink subframe; and the sending, by the base station device, the PDSCH information in the uplink subframe comprises:

sending, by the base station device, the PDSCH information in the selected uplink subframe.

5. The method according to claim 1, wherein the uplink subframe is carried on an uplink carrier, the downlink subframe is carried on a downlink carrier, and the uplink carrier and the downlink carrier are wireless spectrum resources configured in a frequency division duplex (FDD) system.

6. A downlink control information receiving method, comprising:

receiving, by user equipment (UE), downlink control information (DCI) from a base station device, wherein the DCI instructs the UE to receive physical downlink shared channel (PDSCH) information in an uplink subframe; and receiving, by the UE according to the DCI, the PDSCH information from the base station device in the uplink subframe.

7. The method according to claim 6, wherein the method further comprises:

receiving, by the UE, a notification message from the base station device, wherein the notification message is used to indicate a correspondence between a subframe number of a downlink subframe used to send DCI and a subframe number of an uplink subframe used to send PDSCH information, and the notification message comprises a system information block (SIB) or radio resource control (RRC) signaling.

8. The method according to claim 6, wherein the receiving, by UE, DCI sent by a base station device comprises:

performing, by the UE according to downlink transmission mode information, blind detection on the DCI from the base station device, wherein the DCI from the base station device meets: a quantity of bits of the DCI from the base station device that corresponds to a quantity of bits of DCI format 0/format 1A from the base station device, and the DCI from the base station device comprises a cyclic redundancy check (CRC) and/or a scrambling code, wherein the CRC and/or the scrambling code is used to instruct the UE to receive the PDSCH information in the uplink subframe.

9. The method according to claim 8, wherein the performing, by the UE according to the downlink transmission mode information, blind detection on the DCI from the base station device comprises:

descrambling or demasking, by the UE each time a piece of DCI is detected, a cyclic redundancy check (CRC) of the detected DCI by using a scrambling or masking C-RNTI code $x_{rnti,k}$, and determining whether the CRC obtained after the descrambling or demasking is $b_k$; and if the obtained CRC is not $b_k$, descrambling or demasking the CRC of the detected DCI by using the scrambling or masking C-RNTI code $x_{rnti,k}$ and a scrambling code $a_k$, and determining, when the CRC obtained after the descrambling or demasking is $C_k$, that the DCI from the base station device and used to instruct the UE to receive the PDSCH information in the uplink subframe is received.

10. The method according to claim 6, wherein when the UE receives the PDSCH information, the method further comprises:

determining, by the UE according to a correspondence between a subframe number of a downlink subframe used to receive DCI and a subframe number of an uplink subframe used to send ACK/NACK, a subframe number of an uplink subframe used to send the ACK/NACK, and sending the ACK/NACK in the uplink subframe corresponding to the determined subframe number of the uplink subframe.

11. A downlink control information sending device, comprising:

a signal transmitter, configured to send downlink control information (DCI) on a physical downlink control channel (PDCCH) of a downlink subframe, wherein the DCI is used to instruct user equipment (UE) to receive physical downlink shared channel (PDSCH) information in an uplink subframe; and the signal transmitter is further configured to send the PDSCH information in the uplink subframe.

12. The sending device according to claim 11, wherein:

the signal transmitter is further configured to send a notification message to the UE, wherein the notification message is used to indicate a correspondence between a subframe number of a downlink subframe used to send DCI and a subframe number of an uplink subframe used to send PDSCH information, and the notification message comprises a a system information block (SIB) or radio resource control (RRC) signaling.

13. The sending device according to claim 11, wherein that the sending device sends the DCI on the PDCCH of the downlink subframe meets: a quantity of bits of the DCI sent by the sending device is the same as a quantity of bits of DCI format 0/format 1A sent by the sending device, and the DCI sent by the sending device comprises a cyclic redundancy check (CRC) and/or a scrambling code, wherein the CRC and/or the scrambling code is used to instruct the UE to receive the PDSCH information in the uplink subframe.

14. The sending device according to claim 11, wherein the sending device further comprises: a processor, wherein the processor is configured to: before the DCI is sent on the PDCCH of the downlink subframe, select an uplink subframe that can be used to send the PDSCH information, and determine, according to the correspondence between a subframe number of a downlink subframe used to send DCI and a subframe number of an uplink subframe used to send PDSCH information, a subframe number that is of a downlink subframe and corresponding to a subframe number of the selected uplink subframe used to send the PDSCH information;

the signal transmitter is specifically configured to send the DCI on the PDCCH of the downlink subframe corresponding to the determined subframe number of the downlink subframe; and the signal transmitter is further specifically configured to send the PDSCH information in the selected uplink subframe.

15. The sending device according to claim 11, wherein the uplink subframe is carried on an uplink carrier, the downlink subframe is carried on a downlink carrier, and the uplink carrier and the downlink carrier are wireless spectrum resources configured in a frequency division duplex (FDD) system.

16. A downlink control information receiving device, comprising:
   a signal receiver, configured to receive downlink control information (DCI) from a base station device, wherein the DCI instructs user equipment (UE) to receive physical downlink shared channel (PDSCH) information in an uplink subframe; and
   the signal receiver is further configured to receive, according to the DCI, the PDSCH information from the base station device in the uplink subframe.

17. The receiving device according to claim 16, wherein:
   the signal receiver is further configured to receive a notification message from the base station device, wherein the notification message is used to indicate a correspondence between a subframe number of a downlink subframe used to send DCI and a subframe number of an uplink subframe used to send PDSCH information, and the notification message comprises a system information block (SIB) or radio resource control (RRC) signaling.

18. The receiving device according to claim 16, wherein:
   the signal receiver is specifically configured to perform, according to downlink transmission mode information, blind detection on the DCI from the base station device, wherein the DCI from the base station device meets: a quantity of bits of the DCI from the base station device that corresponds to a quantity of bits of DCI format 0/format 1A from the base station device, and the DCI from the base station device comprises a cyclic redundancy check (CRC) and/or a scrambling code, wherein the CRC and/or the scrambling code is used to instruct the UE to receive the PDSCH information in the uplink subframe.

19. The receiving device according to claim 18, wherein the signal receiver is specifically configured to:
   descramble or demask, each time a piece of DCI is detected, a cyclic redundancy check (CRC) of the detected DCI by using a scrambling or masking C-RNTI code $x_{rnti,k}$, and determine whether the CRC obtained after the descrambling or demasking is $b_k$; and
   if the obtained CRC is not $b_k$, descramble or demask the CRC of the detected DCI by using the scrambling or masking C-RNTI code $x_{rnti,k}$ and a scrambling code $a_k$, and determine, when the CRC obtained after the descrambling or demasking is $C_k$, that the DCI from the base station device and used to instruct the UE to receive the PDSCH information in the uplink subframe is received.

20. The receiving device according to claim 16, wherein the receiving device further comprises: a signal transmitter, the signal transmitter is specifically configured to: determine, according to a correspondence between a subframe number of a downlink subframe used to receive DCI and a subframe number of an uplink subframe used to send ACK/NACK, a subframe number of an uplink subframe used to send the ACK/NACK, and send the ACK/NACK in the uplink subframe corresponding to the determined subframe number of the uplink subframe.

\* \* \* \* \*

UNITED STATES PATENT AND TRADEMARK OFFICE
CERTIFICATE OF CORRECTION

PATENT NO. : 10,244,552 B2
APPLICATION NO. : 15/363327
DATED : March 26, 2019
INVENTOR(S) : Yongxia Lyu et al.

Page 1 of 1

It is certified that error appears in the above-identified patent and that said Letters Patent is hereby corrected as shown below:

In the Claims

Column 34, Line 54, In Claim 3, delete "is the same as" and insert -- corresponds to --, therefor.

Column 36, Line 33, In Claim 12, after "comprises a" delete "a".

Column 36, Line 38, In Claim 13, delete "is the same as" and insert -- corresponds to --, therefor.

Signed and Sealed this
Twelfth Day of November, 2019

Andrei Iancu
*Director of the United States Patent and Trademark Office*